US009846104B1

(12) United States Patent
Thompson et al.

(10) Patent No.: US 9,846,104 B1
(45) Date of Patent: Dec. 19, 2017

(54) EVAP II—LEAK VERIFICATION AND DETECTION FOR VEHICLE FUEL CONTAINMENT SYSTEMS

(71) Applicants: Bernie C. Thompson, Albuquerque, NM (US); Neal R. Pederson, Los Alamos, NM (US)

(72) Inventors: Bernie C. Thompson, Albuquerque, NM (US); Neal R. Pederson, Los Alamos, NM (US)

(73) Assignee: Automotive Test Solutions, Inc., Albuquerque, NM (US)

( * ) Notice: Subject to any disclaimer, the term of this patent is extended or adjusted under 35 U.S.C. 154(b) by 29 days.

(21) Appl. No.: 15/178,997

(22) Filed: Jun. 10, 2016

Related U.S. Application Data

(63) Continuation of application No. 13/789,179, filed on Mar. 7, 2013, now Pat. No. 9,390,565, which is a continuation-in-part of application No. 13/115,516, filed on May 25, 2011, now abandoned.

(60) Provisional application No. 61/348,078, filed on May 25, 2010.

(51) Int. Cl.
  G06F 11/00 (2006.01)
  G01M 3/22 (2006.01)
  G07C 5/00 (2006.01)

(52) U.S. Cl.
  CPC .............. *G01M 3/226* (2013.01); *G07C 5/00* (2013.01)

(58) Field of Classification Search
  USPC .......................................... 702/51, 182–185
  See application file for complete search history.

(56) References Cited

U.S. PATENT DOCUMENTS

| | | | |
|---|---|---|---|
| 2,665,257 | A | 1/1954 | Potter |
| 3,426,580 | A | 2/1969 | Callahan, Jr. |
| 3,645,127 | A | 2/1972 | Mongodin et al. |
| 3,664,965 | A | 5/1972 | Hirota et al. |
| 4,784,959 | A | 11/1988 | Wegrzyn |
| 4,822,743 | A | 4/1989 | Wegrzyn |
| 6,085,576 | A | 7/2000 | Sunshine et al. |
| 6,149,952 | A | 11/2000 | Horan |

(Continued)

FOREIGN PATENT DOCUMENTS

WO   WO/2011/141707   11/2011

OTHER PUBLICATIONS

Compressed Gas Pressure Regulators. Datasheet [online], Thomasnet, Jan. 13, 2013 [retrieved on May 9, 2014. Retrieved from the Internet: <URL:http:www.thomasnet.com/articles/instruments-controls/gas-pressure-regulators>.

(Continued)

Primary Examiner — Edward Raymond
(74) Attorney, Agent, or Firm — DeWitt M. Morgan

(57) ABSTRACT

An off-board vehicle fuel handling and containment system leak tester that uses CO2 gas in order to find the location of the leak site. An external source of CO2 gas is used to pressurize the fuel containment system to a pressure greater than the surrounding pressure. An electronic detector capable of detecting CO2 gas is used to scan at least some of the containment system's external surfaces for the presence of the escaping CO2 gas. When the electronic detector senses the CO2 gas an alert system is activated. Once the leak site area is known a leak finding composition of matter is applied to the leak site area in order to identify the exact point of leakage.

13 Claims, 11 Drawing Sheets

(56) References Cited

U.S. PATENT DOCUMENTS

| | | | |
|---|---|---|---|
| 6,647,761 B2 | 11/2003 | Barjesteh | |
| 6,679,098 B2 | 1/2004 | Cardinale | |
| 6,772,598 B1 * | 8/2004 | Rinehart | F25B 49/005 |
| | | | 340/632 |
| 7,051,577 B2 | 5/2006 | Komninos | |
| 7,159,445 B2 | 1/2007 | Bohm et al. | |
| 7,448,517 B2 | 11/2008 | Shieh et al. | |
| 7,779,675 B2 | 8/2010 | Wetzig et al. | |
| 8,003,391 B2 | 8/2011 | Marganski et al. | |
| 8,085,301 B2 | 12/2011 | Hill, Jr. et al. | |
| 8,537,019 B2 | 9/2013 | Rolff | |
| 2004/0118185 A1 | 6/2004 | Duerr | |
| 2004/0154379 A1 | 8/2004 | Enquist | |
| 2005/0126265 A1 | 6/2005 | Herzog et al. | |
| 2005/0284211 A1 | 12/2005 | Cram et al. | |
| 2006/0257094 A1 | 11/2006 | McEvoy et al. | |
| 2008/0245666 A1 | 10/2008 | Diehl | |

OTHER PUBLICATIONS

CO2 Responder Portable Carbon Dioxide Detector, Datasheet [online]. Calibration Technologies Inc., Feb. 2013 [retrieved on May 12, 2014]. Retrieved from the Internet: <URL:https:/www.ctiengineering.com/images/co2%20responder%20brochure.pdf>; pp. 1 and 2.

* cited by examiner

Vacuum Decay Rates

| Volume (gal) | .007 Leak (s) | .010 Leak (s) | .015 Leak (s) | .020 Leak (s) | .025 Leak (s) | .030 Leak (s) | .035 Leak (v) | .040 Leak (v) | .045 Leak (v) | .050 Leak (v) | .055 Leak (v) |
|---|---|---|---|---|---|---|---|---|---|---|---|
| 0.42 | 3.08 | 1.25 | 0.72 | 0.39 | 0.25 | 0.11 | .66v | .57v | .37v | .36v | .30v |
| 1 | 8.67 | 5.14 | 2.47 | 1.36 | 1.26 | 0.41 | .66v | .57v | .37v | .36v | .30v |
| 2 | 14.91 | 10.14 | 4.84 | 2.53 | 2.06 | 0.81 | .66v | .57v | .37v | .36v | .30v |
| 3 | 23.34 | 15.56 | 6.95 | 3.33 | 3.02 | 1.20 | .66v | .57v | .37v | .36v | .30v |
| 4 | 32.08 | 20.26 | 9.37 | 4.53 | 3.99 | 1.47 | .65v | .57v | .37v | .36v | .30v |
| 5 | 42.44 | 25.39 | 12.08 | 6.00 | 4.56 | 1.86 | .65v | .57v | .37v | .36v | .30v |
| 6 | 63.37 | 30.98 | 14.04 | 7.16 | 5.80 | 2.36 | .65v | .57v | .37v | .36v | .30v |
| 7 | 72.78 | 35.66 | 17.27 | 8.18 | 6.95 | 2.38 | .65v | .57v | .37v | .36v | .30v |
| 8 | 80.58 | 40.55 | 19.84 | 9.62 | 7.70 | 3.19 | .64v | .57v | .37v | .36v | .30v |
| 9 | 94.39 | 46.08 | 22.41 | 11.73 | 9.08 | 3.42 | .64v | .56v | .37v | .36v | .30v |
| 10 | 102.06 | 50.06 | 24.81 | 13.45 | 9.78 | 3.97 | .63v | .56v | .37v | .36v | .30v |
| 11 | 110.81 | 55.47 | 27.25 | 14.20 | 11.00 | 4.53 | .63v | .56v | .37v | .36v | .30v |
| 12 | 125.62 | 60.62 | 29.84 | 15.67 | 12.36 | 5.44 | .63v | .55v | .37v | .36v | .30v |
| 13 | 142.81 | 64.72 | 32.95 | 16.98 | 13.81 | 5.84 | .62v | .55v | .37v | .36v | .30v |
| 14 | 148.95 | 69.19 | 35.03 | 18.34 | 14.08 | 6.00 | .61v | .54v | .37v | .36v | .30v |
| 15 | 155.09 | 74.17 | 37.17 | 19.91 | 15.47 | .71v | .61v | .54v | .37v | .36v | .30v |
| 16 | 170.07 | 78.84 | 38.19 | 21.22 | 16.28 | .70v | .60v | .54v | .37v | .36v | .30v |
| 17 | 190.33 | 79.23 | 41.27 | 22.28 | 18.01 | .70v | .60v | .53v | .37v | .36v | .30v |
| 18 | 202.83 | 87.09 | 42.02 | 23.19 | 19.47 | .69v | .60v | .53v | .37v | .36v | .30v |
| 19 | 211.02 | 88.72 | 44.39 | 25.19 | 20.50 | .69v | .59v | .52v | .37v | .36v | .30v |
| 20 | 219.01 | 90.32 | 46.76 | 26.91 | 22.47 | .68v | .59v | .52v | .37v | .36v | .30v |
| 21 | 224.99 | 96.55 | 47.23 | 27.47 | 23.64 | .68v | .58v | .51v | .37v | .36v | .30v |
| 22 | 249.88 | 98.32 | 52.02 | 28.61 | 24.23 | .68v | .58v | .50v | .37v | .36v | .30v |
| 23 | 270.08 | 102.86 | 55.27 | 29.29 | 25.47 | .68v | .58v | .50v | .37v | .36v | .30v |
| 24 | 281.92 | 107.89 | 56.27 | 29.97 | 27.02 | .68v | .58v | .50v | .37v | .36v | .30v |

FIG 6

EVAP Pressure Build Time

| Volume (gal) | Chart D (s) |
|---|---|
| 0.42 | 1.27 |
| 1 | 2.01 |
| 2 | 5.59 |
| 3 | 8.16 |
| 4 | 11.79 |
| 5 | 14.37 |
| 6 | 15.53 |
| 7 | 21.67 |
| 8 | 23.74 |
| 9 | 25.70 |
| 10 | 28.58 |
| 11 | 29.94 |
| 12 | 37.33 |
| 13 | 38.86 |
| 14 | 40.90 |
| 15 | 44.83 |
| 16 | 46.37 |
| 17 | 52.47 |
| 18 | 54.41 |
| 19 | 56.11 |
| 20 | 74.05 |
| 21 | 75.25 |
| 22 | 78.19 |
| 23 | 83.37 |
| 24 | 85.90 |

FIG 7

*Pressure Decay Rates*

| Volume (gal) | .007 Leak (s) | .010 Leak (s) | .015 Leak (s) | .020 Leak (s) | .025 Leak (s) | .030 Leak (v) | .035 Leak (v) | .040 Leak (v) | .045 Leak (v) | .050 Leak (v) | .055 Leak (v) |
|---|---|---|---|---|---|---|---|---|---|---|---|
| 0.42 | 3.33 | 1.47 | 0.76 | 0.41 | 0.28 | .41s | .69v | .57v | .35v | .32v | .29v |
| 1 | 14.06 | 4.69 | 2.52 | 1.61 | 1.16 | .56s | .69v | .56v | .35v | .32v | .29v |
| 2 | 22.36 | 7.50 | 4.50 | 2.37 | 2.36 | .81s | .68v | .56v | .35v | .32v | .29v |
| 3 | 28.92 | 12.50 | 7.70 | 3.73 | 3.22 | 1.5s | .68v | .56v | .35v | .32v | .29v |
| 4 | 45.19 | 16.42 | 8.72 | 4.55 | 3.97 | 1.92s | .68v | .55v | .35v | .32v | .29v |
| 5 | 55.92 | 20.11 | 10.92 | 6.00 | 5.23 | .75v | .68v | .55v | .35v | .32v | .29v |
| 6 | 71.03 | 23.72 | 13.95 | 7.06 | 6.23 | .74v | .68v | .55v | .35v | .32v | .29v |
| 7 | 80.33 | 29.58 | 16.32 | 8.22 | 7.20 | .74v | .68v | .55v | .35v | .32v | .29v |
| 8 | 82.80 | 35.78 | 17.37 | 9.69 | 8.47 | .73v | .67v | .55v | .35v | .32v | .29v |
| 9 | 97.81 | 40.41 | 21.06 | 10.64 | 9.73 | .73v | .67v | .55v | .35v | .32v | .29v |
| 10 | 109.02 | 47.17 | 23.74 | 12.59 | 10.92 | .73v | .67v | .55v | .35v | .32v | .29v |
| 11 | 128.03 | 52.69 | 25.80 | 13.31 | 11.20 | .72v | .66v | .55v | .35v | .32v | .29v |
| 12 | 136.02 | 58.06 | 28.51 | 14.45 | 12.09 | .72v | .65v | .54v | .35v | .32v | .29v |
| 13 | 146.02 | 59.86 | 31.39 | 15.53 | 14.00 | .71v | .65v | .54v | .35v | .32v | .29v |
| 14 | 153.94 | 64.69 | 32.03 | 16.98 | 15.06 | .71v | .64v | .54v | .35v | .32v | .29v |
| 15 | 162.08 | 70.84 | 35.70 | 18.14 | 16.69 | .71v | .63v | .53v | .35v | .32v | .29v |
| 16 | 184.67 | 74.84 | 37.09 | 19.75 | 17.78 | .70v | .62v | .52v | .35v | .32v | .29v |
| 17 | 196.22 | 78.86 | 39.86 | 21.89 | 18.49 | .70v | .62v | .51v | .35v | .32v | .29v |
| 18 | 206.58 | 85.36 | 42.97 | 22.72 | 18.93 | .69v | .61v | .51v | .35v | .32v | .29v |
| 19 | 215.66 | 90.25 | 44.86 | 23.48 | 20.42 | .68v | .61v | .50v | .35v | .32v | .29v |
| 20 | 222.92 | 94.72 | 47.19 | 24.44 | 22.10 | .67v | .61v | .49v | .35v | .32v | .29v |
| 21 | 230.80 | 104.34 | 48.77 | 26.45 | 22.56 | .65v | .60v | .49v | .35v | .32v | .29v |
| 22 | 258.02 | 106.20 | 51.70 | 28.12 | 23.67 | .65v | .60v | .49v | .35v | .32v | .29v |
| 23 | 270.77 | 111.00 | 52.45 | 29.52 | 24.14 | .64v | .60v | .49v | .35v | .32v | .29v |
| 24 | 283.53 | 113.39 | 54.39 | 30.75 | 24.90 | .64v | .60v | .49v | .35v | .32v | .29v |

FIG. 8

EVAP Machine Decay Rates

| Decay | Rate |
|---|---|
| .005 | 17.2 Second Per Gallon |
| .010 | 4.1 Second Per Gallon |
| .015 | 2.48 Second Per Gallon |
| .020 | 1.18 Second Per Gallon |
| .025 | 0.82 Second Per Gallon |
| .030 | 0.48 Second Per Gallon |
| .035 | 0.43 Second Per Gallon |
| .040 | 0.33 Second Per Gallon |

FIG 9

EVAP II—LEAK VERIFICATION AND DETECTION FOR VEHICLE FUEL CONTAINMENT SYSTEMS

CROSS-REFERENCE TO RELATED APPLICATIONS

This application is a continuation of, and claims priority to and the benefit of: U.S. application Ser. No. 13/789,179, entitled "Leak Verification and Detection For Vehicle Fuel Containment Systems", filed Mar. 7, 2013; which is a continuation-in-part of U.S. application Ser. No. 13/115,516, entitled "Leak Verification and Detection For Vehicle Fuel Containment Systems," filed May 25, 2011; which is a continuation-in-part of U.S. Provisional Patent Application Ser. No. 61/348,078, entitled "Leak Verification and Detection For Vehicle Fuel Containment Systems," filed on May 25, 2010. The entirety of these applications is incorporated by reference here.

FIELD OF THE INVENTION

The present invention is a leak verification and detection system for use with fuel containment systems.

BACKGROUND

In the mid 1960's emission laws became a known factor that the automotive industry had to comply with. By 1970 the emission law had expanded to the fuel handling and containment system of the automobile. As the concern for air quality within the United States grew, more stringent emission laws were passed. In 1996, new emission laws were implemented called on-board diagnostics II, or OBDII. These new laws changed the regulations on the tailpipe emissions and the systems that were carried on the vehicle. The fuel handling and containment system would now have to test for electrical circuit problems, system operation, and system leakage. The system leakage from the containment system that would have to be found, and a diagnostic trouble code set for such leakage, would be a hole diameter greater than 0.040 of an inch or the equivalent of two or more holes that are equal or larger than the 0.040 spec. FIG. 1 shows some of the components of a basic OBDII fuel containment system. In the basic vacuum decay EVAP system shown in FIG. 1 there are two main control valves; purge control valve or solenoid (1) and vent control valve of solenoid (6). The purge control valve (1) is naturally closed and the vent control valve (6) is naturally open. The vent control valve (6) is open under all operational conditions until the on board computer (2) has determined the enabling criteria is correct to run a diagnostic test. At this time the vent valve (6) is turned on, this command closes the vent control valve, thus sealing the fuel containment and handing system from the atmosphere. The purge control valve (1) is then pulsed open and closed; this valve is connected to the engine intake manifold (4) where vacuum is present from a running engine. This vacuum pulls the air out of the fuel containment and handing system. As the air volume is removed, the system goes into a negative pressure (vacuum) state. This pressure s monitored by the engine control module (2) by using the fuel tank pressure sensor (8) located in fuel tank (10). The pressure in the fuel containment and handing system is pulled to a target pressure, usually about 7 inches of water column by turning the purge control valve (1) on and off. Once the target pressure has been reached the purge control valve (1) is turned off allowing it to close. The fuel containment and handing system is now sealed. The engine control module (2) monitors the fuel containment and handing system pressure using fuel tank pressure sensor (8). If there are no leaks present in the fuel containment and handing system the pressure will stay at the target pressure, approximately 7 inches of water column. This negative pressure is timed by the engine control module (2), if the pressure stays at the target pressure for a predetermined time there is no leakage present at the time the test was run. If the pressure decays (changes) in the clocked time period a leak or leaks are present within the system at the time the test was run. The amount of pressure decay from the fuel containment and handing system in the timed period will give the size of leakage from the system.

With this testing requirement of 0.040 of an inch diameter hole size, the automotive manufacturers would need to test at a smaller hole diameter than the specified hole size. This is due to a bell curve effect, which means that if the hole size was tested at the specified diameter, some of the failures would be assigned a pass and some a failure. Since the requirement is to make sure all leaks greater than 0.040 inch diameter produce a Diagnostic Trouble Code (DTC) to indicate an Evaporative Emission System (EVAP) failure, the leak test would have to be run for a hole size smaller than 0.040 of an inch. The hole size for the leakage test would be approximately a 0.030 inch hole in diameter. The leakage from this hole size is not a problem for the vehicle's onboard system to test and find, nor is this hole size a problem for off-board testing equipment to test and find, such as a smoke machine.

In the year 2000, new fuel containment leakage laws were implemented. The new laws cut the allowable leakage from the fuel containment system down to a hole size diameter of 0.020 of an inch. This is a 75% leakage testing reduction in the fuel containment system. This hole size diameter is very difficult for the vehicle's on-board system to find and code. New on-board systems would be implemented into the vehicle that could accurately detect this very small hole size diameter. However, due to the hole size and variables such as Reid Vapor Pressure (RVP) from the fuel, these new on-board systems can produce false diagnostic codes. The automotive industry's present off-board testing equipment, such as smoke machines, could no longer find and locate these very small hole diameters. The smoke or vapor that is produced by these machines, in perfect conditions, is hardly visible out of a 0.015 inch diameter size hole. In the automotive service bay, this vapor may not be detectable. This 0.015 inch diameter size hole is where these new vehicle containment systems are now testing at. This smaller than 0.020 hole size, approximately 0.015 of an inch, is once again used as the testing criteria due to the testing bell curve. The newest standard for evaporative emission containment systems is now the Partial Zero Emission Vehicle, or PZEV. This new standard is one in which the containment system is tested to a 0.008 inch diameter hole size, which is even harder to identify and locate.

What is needed in the automotive industry is a method that can be used off-board the vehicle to verify system leakage and then locate the point of such leakage. In the present invention, an off-board vacuum and pressure pump is used with a pressure transducer, reservoir chamber, and a calibrated orifice. The vacuum-pressure pump moves air into or out of the containment system, while the pressure transducer checks the pressure change over time to determine if the system is leaking. Once the system has determined that a leak is present, pressurized carbon dioxide (C02) is put into the containment system. A gas analyzer that can detect gasoline in the form of hydrocarbon (HC) and inert gas in the form of C02 is then used to locate the point of leakage from the vehicle's fuel containment system. A number of prior patents will now be briefly discussed.

In a patent by Reddy, U.S. Pat. No. 5,263,462, a vehicle on-board leak detection system is discussed that describes a way to find leaks in an EVAP system during engine-off periods.

In a patent by Reddy, U.S. Pat. No. 6,321,727, a vehicle on-board leak detection system is discussed that gave more control to his previous patent by the use of a solenoid control valve to control the fresh air vent.

In a patent by Fritz, U.S. Pat. No. 6,889,667, a vehicle on-board leak detection system is shown that uses an electric motor that drives a pump located in the venting valve. This pump pressurizes the fuel containment system. A calibration orifice is used to calibrate the electrical current of the pressure pump to a known leak size, and then a switching valve moves the calibration orifice out of the pump discharge and allows this pressure to fill the fuel containment system. The pressure pump electric current is checked and if it has less current than it had when pushing air through the calibration orifice a leak is present in the fuel containment system. This system test is run during engine-off periods.

In a patent by Kobayashi, U.S. Pat. No. 6,964,193, a vehicle on-board leak detection system is shown that uses an electric motor that drives a pump located in the venting valve. This pump puts the fuel containment system into a negative pressure. A switching valve is used with a calibration orifice. The pump pulls a vacuum against the calibration orifice while a pressure transducer is calibrated to this hole size diameter's pressure. The switching valve now switches the vacuum from the calibration orifice to the fuel containment system. The pressure transducer now monitors the pressure change in the fuel containment system. If the pressure is less than the pressure pulled against the calibration orifice, a leak is present in the fuel containment system. This system test is run during engine-off periods.

In a patent by Behar, U.S. Pat. No. 7,908,099, a vehicle on-board leak detection system is shown that uses a method on a running engine whereby the fuel (gasoline) is moved out of the fuel tank to the engine. As this fuel is removed from the tank, the vapor space within the fuel tank increases. Since a computer is injecting a known volume of fuel into the engine, this increase in vapor space within the fuel containment system is known. Two different calibration orifices of different sizes will be switched into the venting system creating a restriction. The pressure within the tank is read with a pressure transducer with each calibration orifice. This will indicate if a leak is present in the fuel containment system.

In a SAE technical paper, 1999-01-0861 by Delphi Automotive Systems, a vehicle on-board leak detection method is shown that uses a running engine that will supply the vacuum to the fuel containment system. This engine vacuum is sealed into the fuel containment system and watched by a pressure transducer to find small leaks. This system uses the vacuum decay rate to identify the presence of a leak within the fuel containment system.

In all of the prior art, the methods are quite different from the present invention. Some of the same components (e.g., calibration orifices, smoke generating devices) are implemented but the methods used are unique to the present invention. In the prior art, the systems are all on-board vehicle system testing units installed by the manufacturers to test the vehicle's fuel containment system. The invention is designed as an off-board system that checks the vehicle's onboard system and tests the vehicle's fuel containment system. However, many of the methods used in the present invention could be used with or as a part of a manufacturer's on-board fuel containment system test.

SUMMARY OF THE INVENTION

The present invention allows a technician to field test a vehicle's entire on-board fuel handling and containment system with an off-board diagnostic system. This diagnostic system can test the vehicle's on-board computer, the fuel gauge, the fuel tank pressure sending unit if equipped, the purge valve, vent valve, and bypass valve solenoids if equipped, the vehicle's on-board vacuum or pressure pumps if equipped, the calibration pressure switches if equipped, the ability of the fuel containment and handling system to seal, and if the containment system cannot be sealed, the ability to identify the exact size of the leak and the exact location of the leak or leaks.

BRIEF DESCRIPTION OF THE DRAWINGS

FIG. 6 is a vacuum decay rate to volume chart.

FIG. 7 is a pressure build time to volume chart.

FIG. 8 is a pressure decay rate to volume chart.

FIG. 9 is a decay rate chart.

DETAILED DESCRIPTION OF THE PREFERRED EMBODIMENTS OF THE INVENTION

Figure 2A:
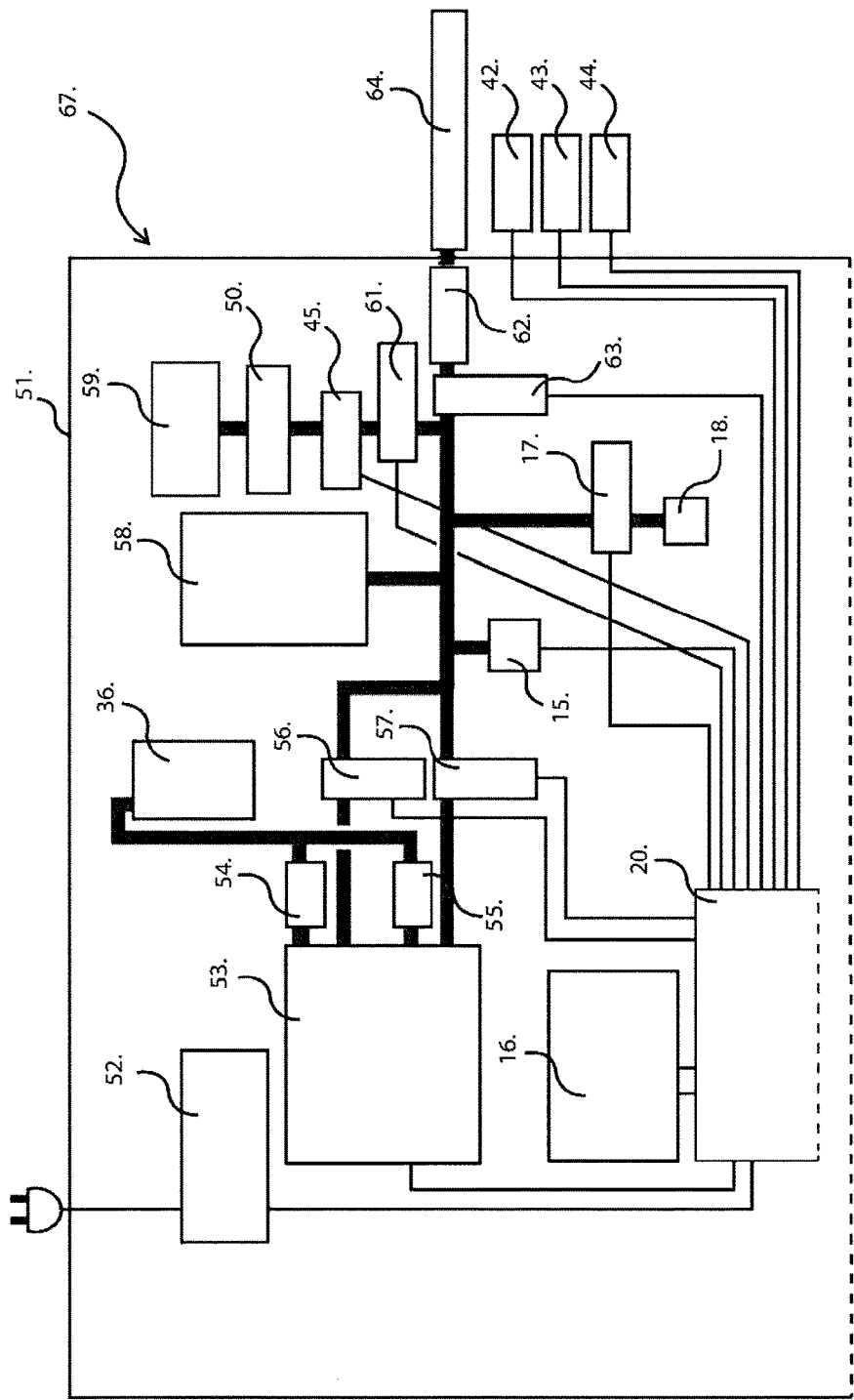
FIG. 2A-2B is a schematic of components for one embodiment of the EVAP machine of the present invention.
Figure 2B:
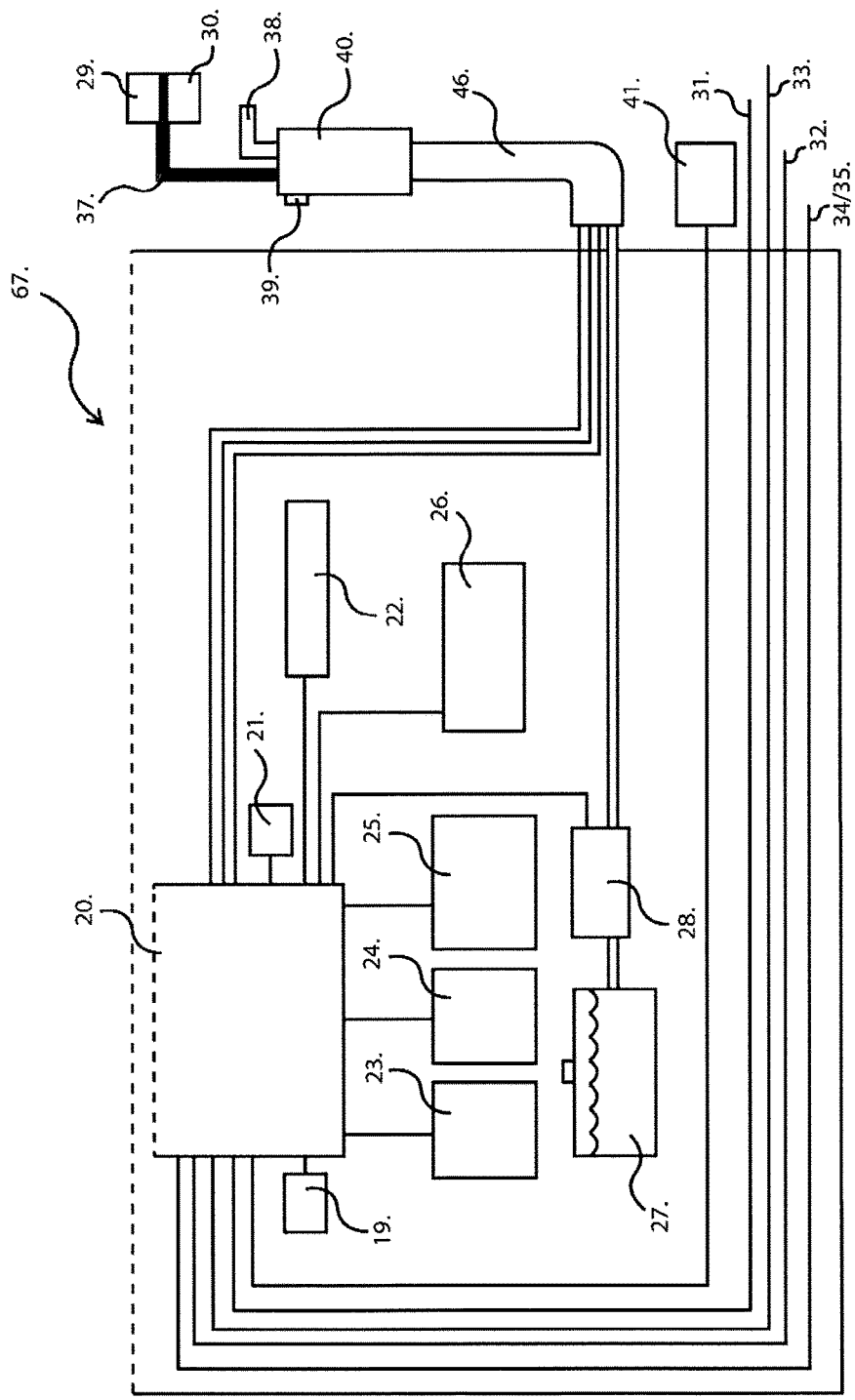
Figure 3A:
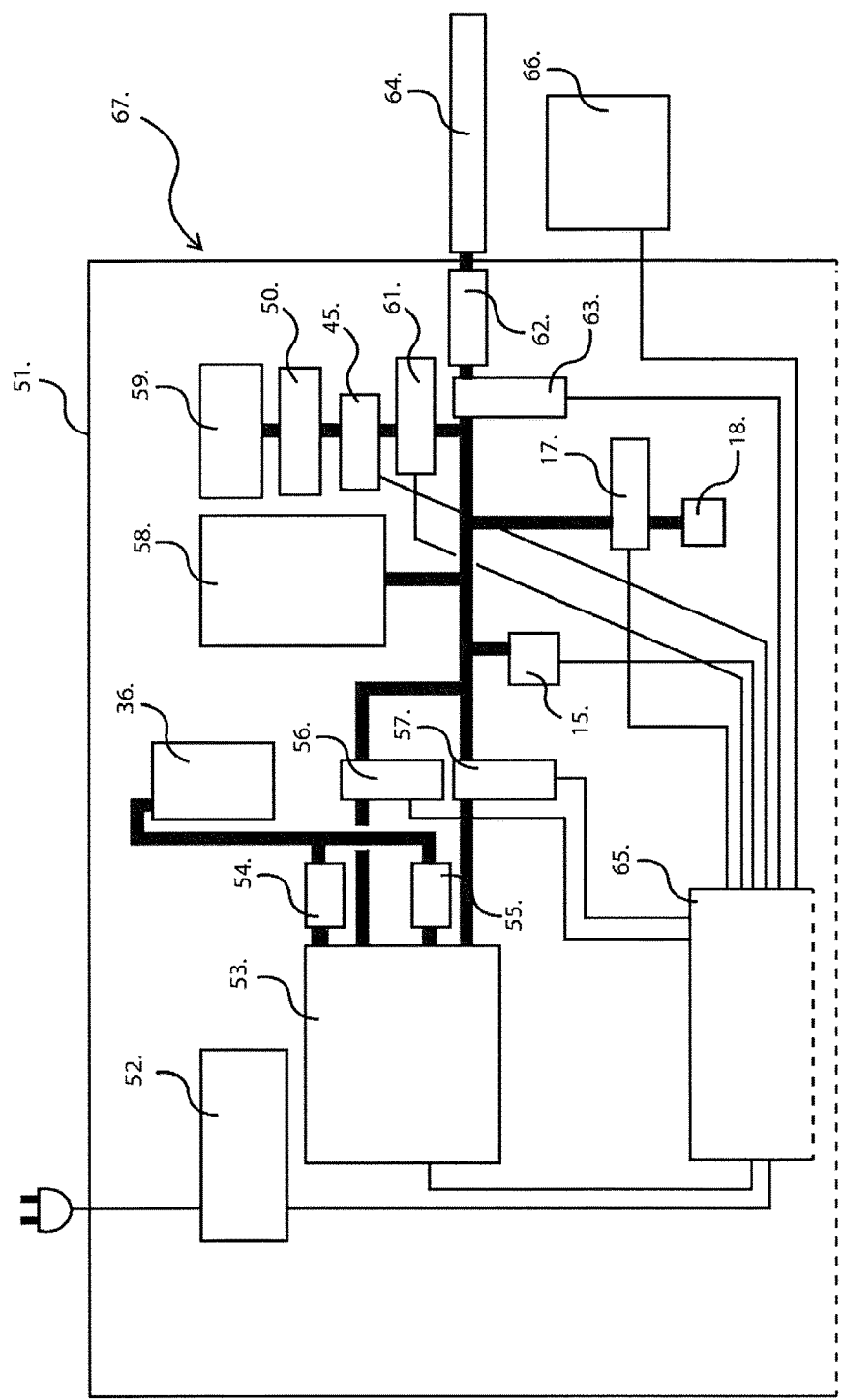
FIG. 3A-B is a schematic of components for another embodiment of the EVAP machine of the present invention.
Figure 3B:
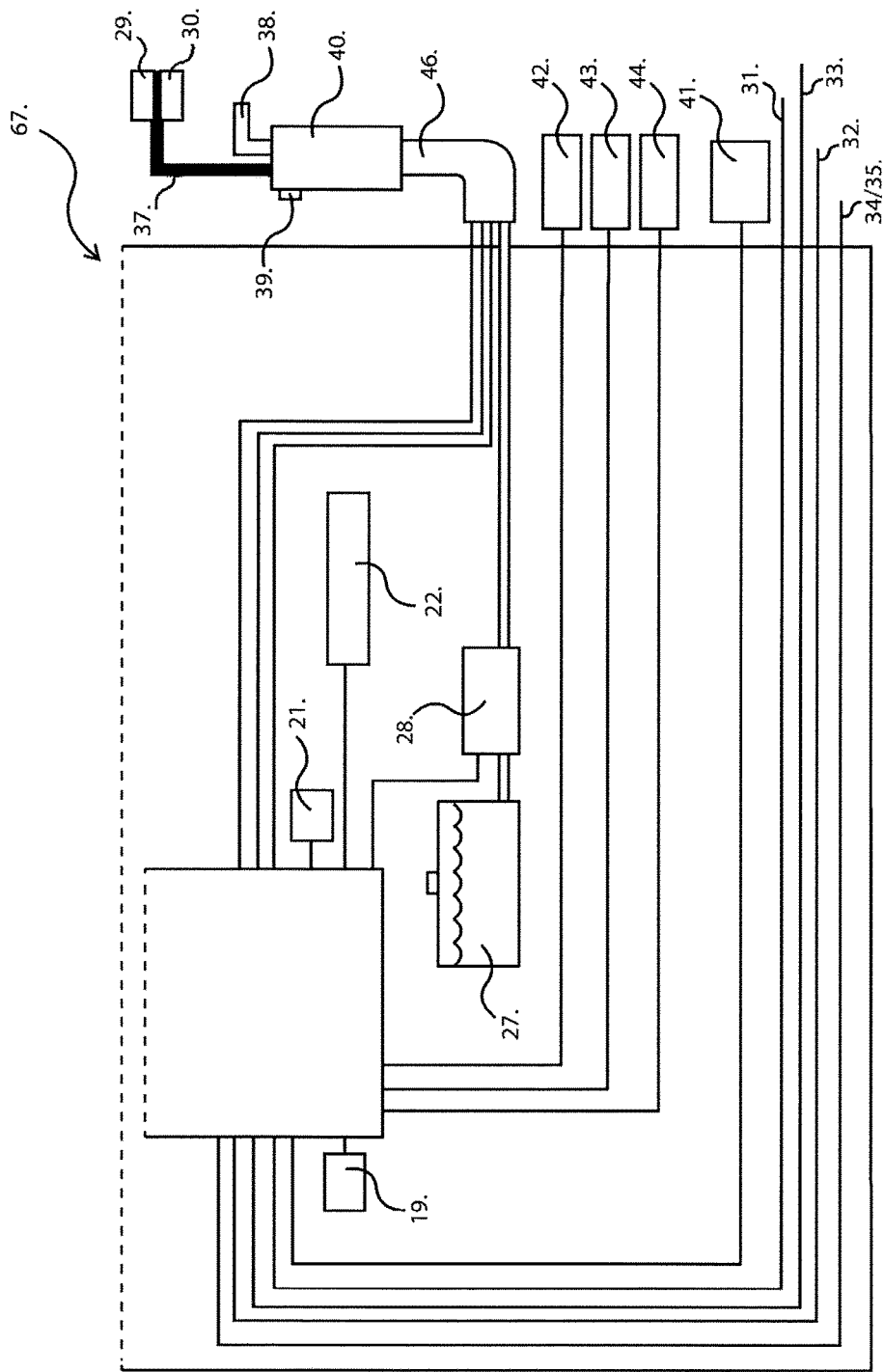

An EVAP machine will be configured in several different configurations that utilize some or all of the components listed. Beginning with the EVAP machine (67) as shown in FIG. 2, the EVAP machine (67) comprises a housing (51), power supply (52), microprocessor (20), display (16), control buttons (26), program select control (25), vacuum-pressure pump (53), vacuum pump filter (54), pressure pump filter (55), outlet filter (62), calibration reservoir (58), calibration orifice (18), pressure transducer (15), solenoid valves (56)-(57)-(61)-(63)-(17), absorption filter (36), temperature sensor (19), fuel level input (23), fuel tank size input (24), alert buzzer (21), alert lamps (22), smart actuator control leads (31)-(32)-(33), voltage read lead (34-35), leak detection pump control leads (42), diagnosis tank leakage module control leads (43), leak detection pump module control leads (44), C02 canister (59), pressure regulator (50), flexible conduit (46), leak find control handle (40), flex hose coupler (37), CO2 sensing cell (29), HC sensing cell (30), leak find solution bottle (27), leak find solution pump (28), leak solution discharge (38), leak pump switch (39), smoke camber (45), vehicle communication interface (VCI) (41), and pressure testing hose (64). FIG. 3 shows the same basic EVAP machine with a PC (65) and USB interface (66).

The EVAP machine (67) preferably includes a microprocessor (20) contained within the EVAP machine (67) or the use of a microprocessor external (65) from the EVAP machine (67), and the microprocessor is programmed to control a vacuum-pressure pump (53) that is connected to a vehicle's on-board fuel handling and containment system with the EVAP machine's testing hose (64) at the service port or purge control hose (on some systems this will be connected to the vent outlet). One such example of a vent outlet connection is on a Diagnosis Module Tank Leakage pump system (DMTL). The pressure pump (53) will move air into or out of the fuel containment and handling system creating a pressure, positive or negative, to be applied to the vehicle's system. Different systems can be used to apply pressure, negative or positive, to produce the same results, as anyone skilled in the art would recognize and understand. The pressure transducer (15) within the EVAP machine (67) then reads this pressure change which allows the program in the microprocessor (20), or PC (65) to control the EVAP diagnostic system.

In order to properly test a fuel containment system, the vapor space within the fuel tank must be known. This is accomplished in one of two ways. The first way is by a technician selecting two inputs: fuel level select input (23), and fuel tank size select input (24). From these two inputs the microprocessor (20), or the microprocessor in PC (65), can calculate the vapor space contained within the containment and handling system. This is the base fuel vapor space calculation. The second way for this calculation is to have the technician enter in the year, make, and model of the vehicle. A look up table within the EVAP machine's microprocessor (20), or the microprocessor in PC (65), will give the tank size for the entered vehicle. A scan tool, or Vehicle Communications Interface (VCI) (41) that is connected to the vehicle will be used to gather the data from the vehicles On-board Diagnostic II (OBDII) computer. This scan tool will be able to gather data in one of two ways: one will be to have the technician manually enter the data from the scan tool to the EVAP machine, and the other will be for the EVAP machine to directly read the data from the vehicle's on-board computer with a VCI (41) and use this data to calculate the vapor space contain within the fuel tank. These two scan tool methods are needed due to the different embodiments of the EVAP machine, as discussed herein. The scan tool will also gather the Diagnostic Trouble Codes (DTC) and the Mode6 Data from the vehicle's OBDII computer to help with the diagnosis on the fuel containment and handling system. Once the calculated vapor space within the fuel tank is known, approximately 1.8 gallons is added to this calculation for the additional vapor space contained within the carbon canister and hoses. The microprocessor (20), or the microprocessor in PC (65), will use this data for containment volume comparison, pump run on times, pressure build times, pressure decay times, leak size calculations, fuel gauge volume comparison, and warnings for inaccurate data due to tank vapor volume.

In order for the EVAP machine (67) to be accurate with the measurements it is taking, it will be calibrated to the atmospheric conditions present at the test site, namely barometric pressure and temperature. This is accomplished by using a calibration reservoir (58) of a known size that is part of the EVAP machine (67). The calibration reservoir pressure is taken with barometric pressure in calibration reservoir (58) by pressure transducer (15) and then calibration reservoir (58) is put under positive and negative pressure by the EVAP machine pump (53). The EVAP machine outlet solenoid valve (63) is closed, the pump (53) is turned on and the pump solenoid valve (57) is opened. A clock in microprocessor (20), or PC (65), is started when the pump solenoid valve (57) is turn on. This calibration reservoir (58) volume pressure build is timed to a set point, which is preferably at 7 inches of water. This now calibrates the pump time to build volume output. Each pump (vacuum-pressure pump) (53), positive and negative pressure is calibrated in this way. The pump (53) is turned off at a set point, which is preferably at 8 inches of water. The pressure is then monitored for any decay. If decay is present the EVAP machine aborts any testing. If there is no decay present, the orifice solenoid valve (17) is turned on allowing a calibration orifice (18) to decay the pressure contained in the reservoir. A dock in microprocessor (20), or PC (65), is started as the pressure is decaying at a set point, which is preferably at 7 inches of water. The clock times the pressure decay to a second set point, which is preferably at 6 inches of water. Both positive and negative pressure will be calibrated in this way. This calibrates the decay rate to a known orifice size. In order to find the total volume of the reservoir, the pressure decay is allowed to continue until a third set point is reached, which is preferably at 0.1 inch of water. The clock times from one set point preferably at 7 inches of water to a third set point preferably at 0.1 inch of water, and this sets the calibration orifice volume to time calculation. The calibration look-up tables are now scaled for the atmospheric conditions present at the test site; this is accomplished by using a multiplier that is created from the data collected from these calibration figures. Now that the EVAP machine is calibrated, actual testing can be performed on the vehicle.

Figure 4:
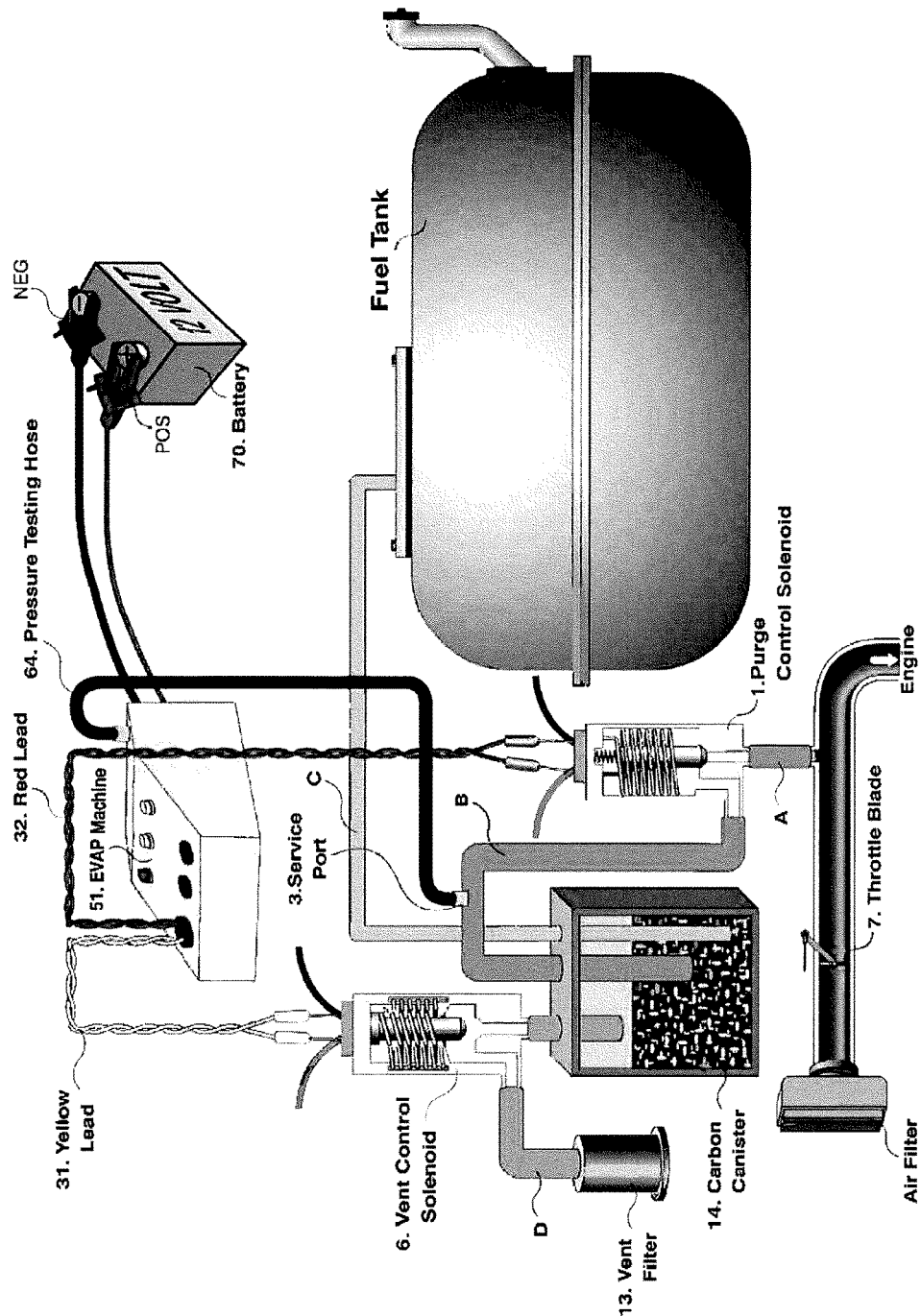
FIG. 4 illustrates the EVAP machine connected to a vacuum decay system.

Once the system to be tested is selected by the service person the microprocessor (20), or PC (65), will put a picture on the screen (16) or the screen of PC (65) of how to connect the EVAP machine (67) to the vehicle, one such example is for a vacuum decay system (FIG. 4). If the system is a vacuum decay style system, the smart leads (yellow lead 31 to vent control solenoid 6; red lead 32 to purge control solenoid 1) are then connected to the vent control solenoid (6) valve and the purge control solenoid valve (1). Each of these solenoids has two wires connecting them, a power wire and a control ground wire. The technician connects the smart leads (31-32-33) to each of the solenoid wires; smart lead one (31) to both wires at the vent solenoid valve (6), and smart lead two (32) to both wires at the purge solenoid valve (1). Each one of the smart lead wires has a bias voltage applied to it through a large resistance that is contained in the EVAP machine (67). This allows the bias voltage to be present in an open circuit but does not affect the circuit when the lead is connected to it; in this case the voltage is dropped across the resistance. The preferred bias voltage is −3.5 volts, but anyone skilled in the art could use other bias voltages to accomplish the same results. If the leads (31, or 32, or 33) is not connected to the associated solenoid wire or a solenoid wire is open, the bias voltage is not changed thus staying at −3.5 volts. The EVAP machine (67) now puts up a message for the technician to check the connection at the solenoid or to check for an open solenoid circuit. If the leads (31-32-33) are connected, the bias voltage is dropped across a large resistor in the EVAP machine (67) and will be pulled close to ground voltage level. Now that the EVAP machine (67) knows the technician has a good connection to the circuit, a message will be displayed to the technician to turn the ignition on. The EVAP machine (67) now waits to see battery voltage at both wires on both solenoids. If any of the wires do not have battery voltage, a message is displayed indicating to check the wiring or fuses to the solenoids. If all solenoid wires have battery voltage, the EVAP machine pulses each wire to ground and checks the voltage drop across a small resistance within the EVAP machine. The power wires have a very small voltage drop and the control wires have a large voltage drop. Due to these voltage drops, the EVAP machine (67) now knows which wires are the power wires and which wires are the control wires to each of the solenoids. The EVAP machine now turns on each of the control wires so current will flow through the solenoid circuits. The EVAP machine (67) monitors the power side when the control side is pulled to ground; this test is to check for resistance on the power circuit. If the voltage drop is lower than a preprogrammed set point, a message is displayed on (16), or the monitor of PC (65) to the technician to check the power circuit. The EVAP machine (67) monitors the voltage drop across a small resistance in the EVAP machine when the control circuit is pulled to ground; this voltage drop is equal to the current within the solenoid circuit. If the current is higher or lower than preprogrammed set points, a message is displayed to the technician indicating to check the solenoid circuit resistance. With the smart lead (31-32-33) configuration the technician does not need to know how to connect to the solenoid wires or test the solenoids, but can just put either smart lead (31-32-33) wire to the wiring of the associated solenoid. The EVAP machine will be able to automatically find the correct wire with which to control the solenoid. The smart lead circuit could be made with an electronic circuit that has no microprocessor but uses electronics to convey information to the technician.

A second method of controlling the vent valve and purge valve solenoids is with the use of a scan tool and commanding the bi-directional control of the solenoid valves. When the scan tool is used two different methods can be utilized. The first method is to have the EVAP machine (67) guide the technician with screen (16), or the screen on PC (65), that will allow the technician to manually use a scan tool to control the vent (6) and purge solenoids (1). The second method is to control the scan tool directly with the EVAP machine (67). The problem with using a scan tool to control the solenoid valves is that not all vehicles support the bi-directional activation of these valves. Additionally the on-board computer on many vehicles may not directly monitor the solenoid circuits. So if there is a problem with one of these solenoid valve circuits, the on-board computer will not recognize the problem and will give the data to the scan tool that shows the commanded state as being on, however the solenoid circuit may not actually be applying the solenoid valve. If the vent solenoid valve (6) cannot be closed, the system will show a large leak when actually the computer or solenoid circuit is the problem. In this condition the smart leads (31-32-33) can be installed on the solenoid circuits so the circuit can be monitored by the EVAP machine. If there is a problem with any of the solenoid circuits, the EVAP machine will display the wire or circuit that is the problem. Additionally, this will check the on-board computer's ability to apply the solenoid valves.

Figure 5:
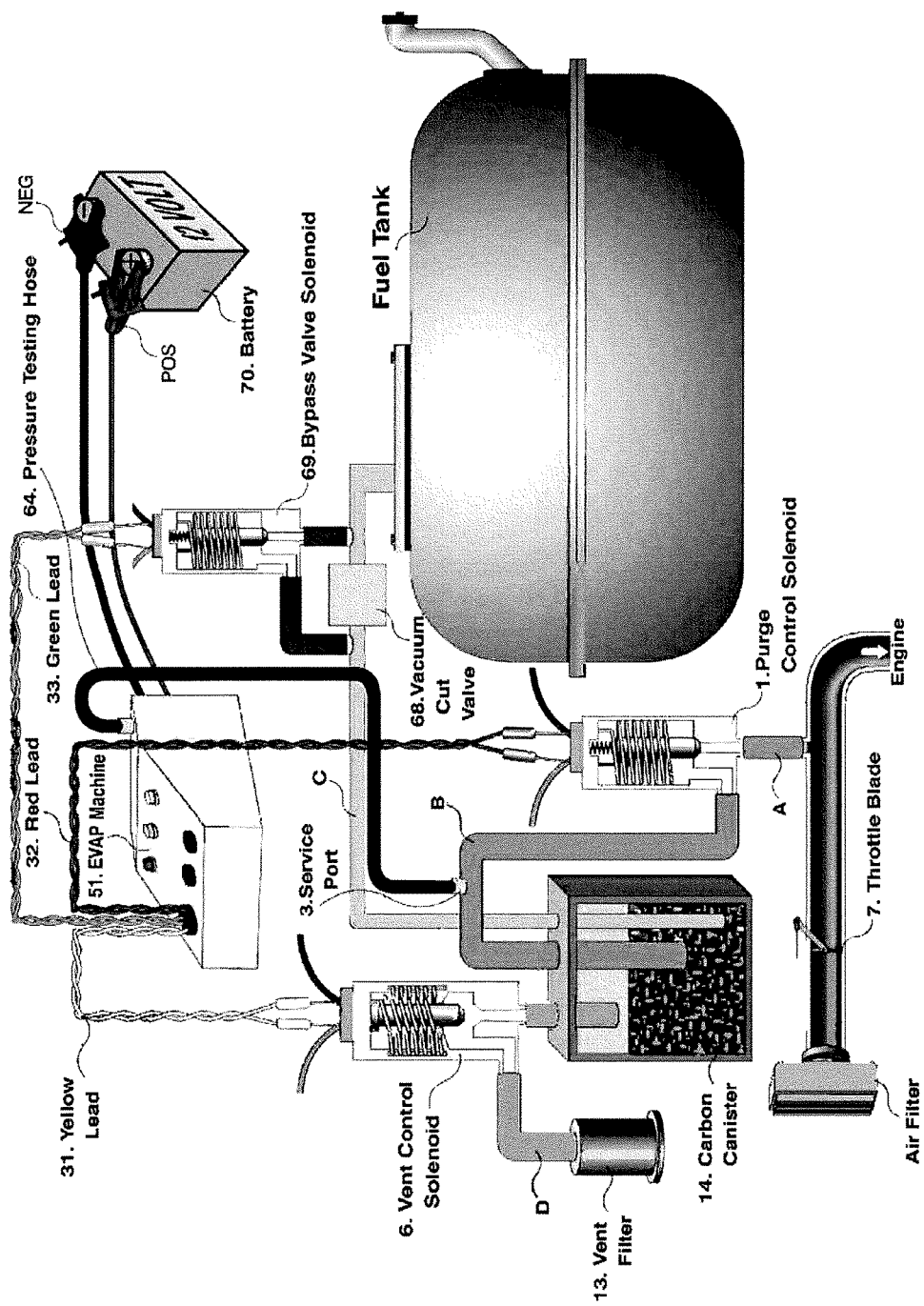
FIG. 5 illustrates the EVAP machine connected to a vacuum decay system with a bypass solenoid.

If the system under test is a vacuum decay with a bypass control solenoid, a third smart lead (33) will be connected to this solenoid (FIG. 5). The same testing sequence will be applied to the bypass solenoid as was applied to the vent valve and purge valve solenoids. This will allow the EVAP machine (67) to test the bypass solenoid circuit thoroughly, and alert the technician to any problem with the bypass valve circuit. The use of the smart leads (31-32-33) could also be split utilizing one wire per solenoid, one would be connected to the vent, purge, or the bypass solenoid. The wires would be tested individually and then the control wires would be found allowing the solenoids to be controlled.

After the solenoid valve circuits have been tested and are known to be good, a containment leak test will be run. The technician will connect the EVAP machine's testing hose (64) to the vehicles containment and handling system. This will allow the EVAP machine (67) to be directly coupled to the vehicle's fuel containment system so the pressure within the containment system is equal to the pressure within the EVAP machine (67). This allows the EVAP machine (67) to monitor the pressure changes using the pressure transducer (15) within the containment and handling system. Once the testing hose (64) is connected to the containment and handling system, the vent valve (6) will be left open and the vacuum pump (53) will be turned on. A slight pressure change from barometric pressure to about 1 inch of water is expected. If the pressure increases greater than a set point, preferably at 2 inches of water, this would indicate that the vent control solenoid (6) is restricted. If the pressure continues to change to a set point, preferably at 8 inches of water, the vent is plugged. In either case, the correct message is displayed that the vent is restricted or the vent is plugged. If the pressure does not increase and is less than 2 inches of water, the vent is open, and in this condition the vent valve is commanded closed. The closing of the vent valve (6) is accomplished with the EVAP machine's smart lead (31) or by using the scan tool's bi-directional controls, as mentioned previously. At the point the vent valve solenoid is closed, a clock is started in the microprocessor (20) or (66). The vacuum pressure build is timed to a set point, preferably at 7 inches of water. By monitoring the time it takes to move the vapor space volume out of the containment and handling system and put the system into a vacuum of 7 inches of water, the containment vapor space can be calculated. This vacuum build time from barometric pressure to 7 inches of water will give the vapor space that is within the fuel containment and handling system. One skilled in the art could find the volume in many different ways using pressure or vacuum; one such way would be the use of a flow meter and a dock. Finding the vapor space of the containment and handling system is very important in order to diagnose Evaporative Emission Systems.

If the vehicle's containment system becomes plugged or blocked from the purge control valve (1) to the carbon canister (14) or from the carbon canister to the fuel tank (line B), the EVAP machine would not indicate a leak in the form of pressure decay, thus missing this type of problem. This is due to the system having a restriction creating a low volume area, not a leak present. Without having the containment and handling system's vapor volume build time calculation or vapor volume decay time calculation, a user such as a technician could not find such a problem. In order to find this type of problem, the EVAP machine (67) takes the calculated vapor space that was entered and determines how long the pump run time will be. The pump is then turned on for the approximate run time for the gallon vapor space calculation. If the pump run time compared to the pressure indicates that less than approximately 1.8 gallons of vapor space are present in the fuel containment system, the system has a restriction. This is due to the carbon canister and connecting hoses containing approximately 1.8 gallons of vapor space. In this condition the display will show the vapor space within the system under test with a message displayed; a restriction is present between the purge valve and the fuel tank.

Figure 1:
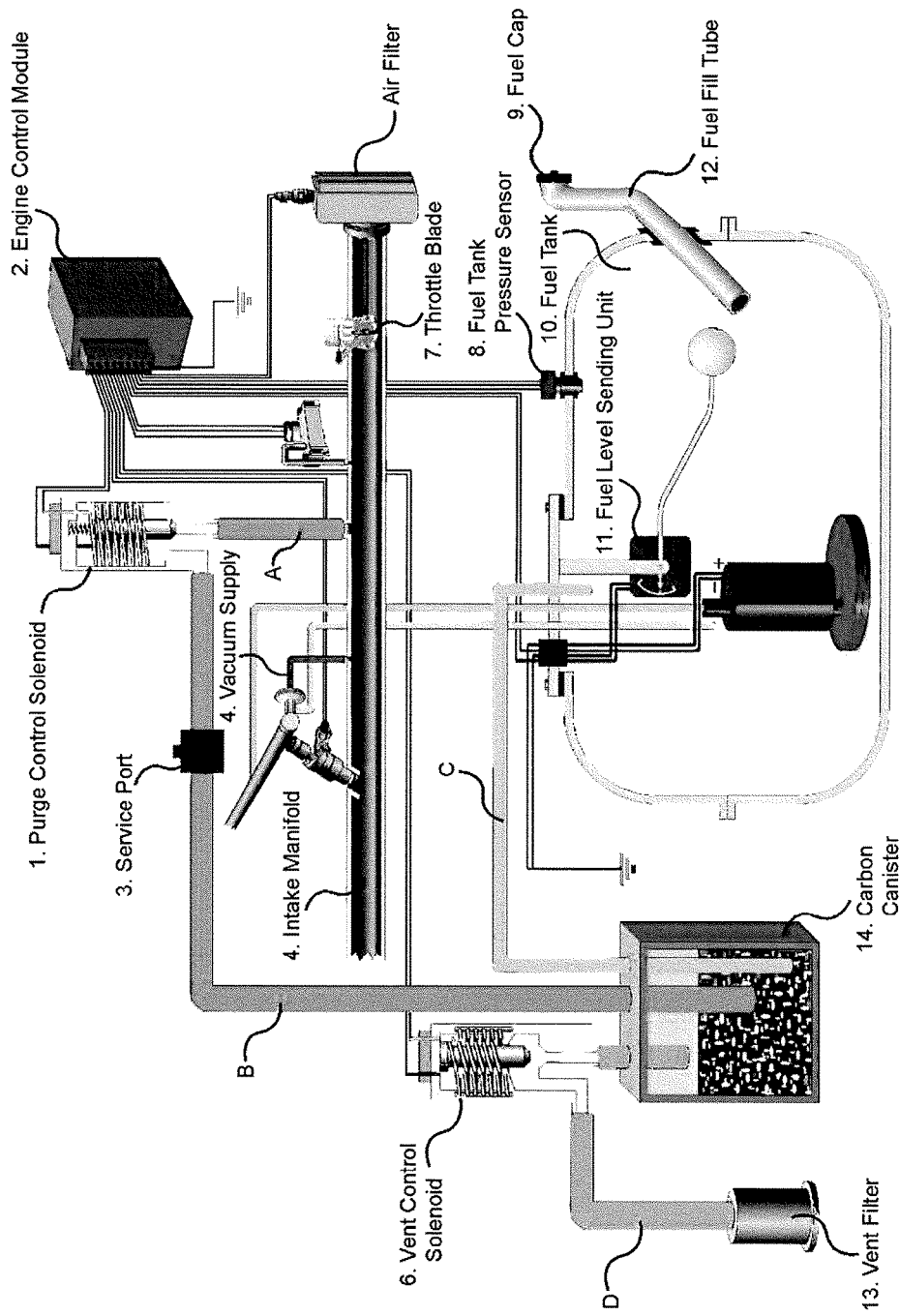
FIG. 1 illustrates a typical OBDII fuel containment system for a vehicle.

When the OBDII system that is built into the vehicle runs a leak test, it may set a DTC for a large leak, when there is actually a restriction in the containment and handling system. With reference to FIG. 1, in this case the vehicle's OBDII computer (2) starts to run an on-board leak test. During this test sequence the purge control valve (1) is turned on, opening the purge valve and exposing the fuel containment system to engine manifold vacuum. This creates a vacuum in the fuel tank (10) when the vent valve (6) is commanded to close to seal the containment and handling system. The vehicle's onboard pressure sensor (8) located in the fuel tank (10) expects a pressure change to occur during this test sequence. If no pressure, or very little pressure change occurred in the fuel tank (10), due to the restriction in the line (B or C) or canister (14), the OBDII computer (2) assumes there is a large leak which is allowing the pressure to leak off and have very little change or not change. Thus, the OBDII system sets a large leak DTC for a plugged or restricted hose. It is quite common for the carbon from the carbon canister (14) to come apart and restrict hoses, lines, and valves within the fuel containment and handling system. Additionally hoses, lines, and valves can be damaged from road debris.

Once the fuel containment and handling system passes the approximately 1.8 gallon set point that is programmed in the EVAP machine (67), the pressure continues to build within the system. The pressure is clocked within the microprocessor (20), or the microprocessor in PC (65) to a preferred set point of 7 inches of water, this is to calculate the vapor space within the containment system. The pressure continues to build passed the preferred 7 inches of water to a set point preferably at 8 inches of water. This target at 8 inches of water column is set to account for the fact that once the pump (53) is shut off the pressure will have a slight drop; down to slightly higher than the 7 inches of water column used for testing. The pump (53) is shut off and the vacuum pump solenoid valve (56) within the EVAP machine (67) is closed. The pressure is then monitored by pressure transducer (15) located inside the EVAP machine (67). The pressure change within the fuel containment and handling system is clocked within the microprocessor (20), or the microprocessor in PC (65). If no pressure change occurs over time there is no leak present. However, if there is a pressure change, the pressure rate of change will give the size of the leak within the fuel containment system. The pressure change is clocked between two set points; the preferred set points and time are 7 inches of water decaying to 6 inches of water in a time period of 60 seconds. However, different pressures or times could be used to obtain the same results.

The vacuum decay rate is then looked up on a chart within the microprocessor (20), or the microprocessor in PC (65), that gives volume to vacuum decay. The calculated vapor space within the containment and handling system is used for the vapor volume of the system and the decay rate is taken from the leak test. By using the volume to decay chart (FIG. 6), the leak size can be accurately calculated. The leak sizes on the chart use a linear interpolation between the points. As can be seen on the volume to decay chart, the volume change to decay rate varies greatly. It will be necessary to have the correct volume measurement in order to calculate an actual leak size based on the decay rate. Once the leak size is calculated, the exact leak size is displayed with a message if the system passed or failed and how large the leak is. These leak messages are preferably no leak, very small leak, small leak, medium leak, large leak, and gross leak.

If the pressure pump (53) cannot obtain the preferred 8 inches of water in a preprogrammed time, a large leak is present. The preprogrammed time will be calculated by the calculated vapor space contained within the fuel tank. This calculated vapor space is looked up on the pressure build time chart (FIG. 7) and the pump run time is multiplied by 2. This will set the maximum pump run time to volume fill. Since the EVAP machine pump flow rate is calibrated by the calibration reservoir and the vapor space is calculated, the time needed to fill the fuel tank with pressure is known. This calculated time will be used for the expected time for pressure to build within the fuel tank. If the preferred 8 inches of water cannot be achieved within the time, the amount of pressure that has built in the fuel containment system will show the size of the large leak.

At the point a large leak is known to be within the containment and handling system, the vent valve (6) is cycled on and off with the pump (53) still running. The pressure within the containment system is monitored for a small change. This indicates that the vent valve can be mechanically opened and closed. If there is no pressure change a message is shown for the technician to plug the vent valve outlet (vent filter 13 or hose D). The leak test is then rerun. If the large leak is no longer present a message is displayed that the vent valve (6) is bad. The leak testing sequence will continue to test the system for a small leak. If the vent valve pressure changed during testing the opening and closing of the valve, the purge valve (1) is now opened and closed with the pump (53) still running. The pressure within the containment system is monitored for a small change. This indicates that the purge valve (1) can be mechanically opened and closed. If there is no pressure change a message is shown for the technician to plug the purge valve inlet (A). The leak test is then rerun. If the large leak is no longer present, a message is displayed indicating that the purge valve (1) is bad. The leak testing sequence will continue to test the system for a small leak. If the vent valve (6) and purge valve (1) both have a slight pressure change, the display will have the technician remove the purge inlet hose (A) from the intake manifold and leak test the entire fuel handling and containment system. This is done because the leak may not be found if the $CO_2$ or smoke (if used) goes into the engine intake manifold (4).

If the fuel containment system shows a leak or no leak, the vent valve (6) is cycled several times. The pressure in the system is built back to the preferred 8 inches of water pressure and the system is retested for a leak. If the leak size changes from the first test by a preprogrammed amount, preferably ±0.005 inch of a leak change, a message is displayed on screen (16), or the screen of PC (65) that the vent valve (6) is leaking and to test the valve leakage with the $CO_2$ or smoke depending on the size of the leak. If the vent valve (6) passes the testing sequence, the purge valve (1) will be cycled several times. The pressure in the system is built back to the preferred 8 inches of water pressure and the system is retested for a leak. If the leak size changes from the first test by a preprogrammed amount, preferably ±0.005 inch of a leak change, a message is displayed that the purge valve (1) is leaking and to test the valve leakage with the $CO_2$ or smoke depending on the size of the leak. If the system has a leak present and both the vent valve (6) and purge valve (1) pass the test sequence, the system will now be put under a positive pressure.

If the fuel containment and handling system had a leak present under negative pressure, or did not have a leak present under a negative pressure, the system will now be put under a positive pressure. Not all leaks will leak under negative pressure, or they may leak under one pressure state and not the other. So it will be necessary to test the fuel handling and containment system under both a negative and positive pressure.

The pressure pump (53) and pressure pump solenoid (57) are turn on. The pump on time is calculated from the calculated vapor space equation. The fuel containment and handling system is put under a positive pressure to a set point, preferably at 8 inches of water. At this set point the pump (53) and solenoid (57) are turned off and a clock is started within the microprocessor (20), or the microprocessor in PC (65). The pressure within the containment and handling system is monitored by a pressure transducer (15) located within the EVAP machine (67). If no pressure change occurs over time, there is no leak present. The pressure rate of change will give the size of the leak within the fuel containment system. The pressure change is clocked by the microprocessor (20), or the microprocessor in PC (65) between two set points; the preferred set points and time are 7 inches of water decaying to 6 inches of water in a time period of 60 seconds. However, different pressures or times could be used to obtain the same results.

The pressure decay rate is then looked up on a chart that gives volume to pressure decay. The calculated vapor space within the containment and handling system is used for the vapor volume of the system and the decay rate is taken from the leak test. By using the volume to decay chart (FIG. 8), the leak size can be accurately calculated. The leak sizes on the chart use a linear interpolation between the points. As can be seen on the volume to decay chart, the volume change to decay rate varies greatly. It will be necessary to have the correct volume measurement in order to calculate an actuate leak size base on the decay rate. Once the leak size is calculated, the exact leak size is displayed on screen (16), or the screen of PC (65), with a message if the system passed or failed and on how large the leak is. These leak messages are preferably no leak, very small leak, small leak, medium leak, large leak, and gross leak.

The vacuum leak size and the pressure leak size are now compared. If the system leaks under vacuum and not under pressure, a message is displayed on screen (16), or the screen of PC (65), indicating to remove the gas cap (9) and install a gas cap filler neck plug or another gas cap. The positive pressure leak test is then rerun; if there is a leak present a message is displayed indicating to check the gas cap plug installation. The pressure test is then rerun. If the fuel containment and handling system now has no positive pressure leakage present, the vacuum or negative pressure leak test is now run. Now if the system does not leak under vacuum a message is displayed on screen (16), or the screen of PC (65), indicating the gas cap (9) is bad and it needs to be replaced. If the system is still leaking under vacuum, a leaking wiggle test is run. In a leaking wiggle test, the fuel containment and handling system is put under pressure, preferably at 8 inches of water. The pressure within the fuel containment system is then monitored for any change. The pressure is decaying due to the leak that is present, so the EVAP machine watches for a change to take place to the decay rate. The technician then physically wiggles all the hoses, lines, canister, filler neck and valves. If a pressure change occurs, an alert lamp and alert buzzer are turned on to notify the technician that what they are presently wiggling is allowing a leak to occur.

If the leaking wiggle test did not have a pressure change showing where the leak is located, a message is displayed indicating to isolate the fuel containment and handling system by blocking off the carbon canister (14) to fuel tank hose (C). The vacuum leak test is now retested. If the vacuum leakage is not present, a message is displayed on screen (16), or the screen of PC (65), indicating the leak location is in the fuel tank assembly (10-12-11-9-8-C). If the leak is still present, a message is displayed on screen (16), or the screen of PC (65,) indicating the leak location is in the carbon canister (14) or hose (C). The problem with finding a leak that occurs under vacuum and not under pressure is that smoke or CO2 will only leak under pressure.

If there was no leak present under vacuum or pressure, the display will have the technician run a no leak wiggle test. In the no leak wiggle test, the fuel containment and handling system is put under pressure, preferably at 8 inches of water. The pressure within the fuel containment system is then monitored for any change. The technician then wiggles all the hoses, lines, canister, filler neck and valves. If a pressure change occurs an alert lamp (22) and alert buzzer (21) are turned on to notify the technician that what they are presently wiggling is allowing a leak to occur.

In the no leak wiggle test, the on-board fuel tank pressure sensor (8) will also be tested. The fuel tank pressure sensor (8) is important; if the sensor drifts its calibration or the sensor's power or ground have a problem, it will misread the pressure within the fuel containment system. The OBDII computer (2) will then set false DTC's for the fuel containment and handling system. The fuel tank pressure sensor (8) will need to be tested for its calibration. The reading from this sensor can be accomplished in two ways: the first one is preformed with a scan tool, and the second one is preformed with a direct voltage reading from the fuel tank pressure sensor (8). Before the system is put under pressure, the reading from the OBDII computer is taken with a scan tool. This can be done by the microprocessor (20), or the microprocessor of PC (65), using display (16), or the screen of PC (65), asking the technician to manually enter the fuel pressure sending unit reading for atmosphere; the EVAP machine (67) can also directly read this fuel pressure sensor reading with a VCI (41). The second method is to connect a voltage test lead (34-35) from the EVAP machine (67) to the fuel tank pressure sensor (8) and directly read the signal voltage produce. The fuel containment and handling system is now put under pressure to the preferred 8 inches of water. The microprocessor (20), or the microprocessor of PC (65), using display (16), or the screen of PC (65), will now ask the technician to manually enter the fuel pressure sending unit (8) reading for pressure; the EVAP machine can directly read this fuel pressure sensor reading with a VCI (41) or from the voltage lead (34-35). The fuel tank pressure sensor (8) readings at atmosphere and under pressure are compared to the pressure transducer (15) within the EVAP machine (67). If these reading differ by a preprogrammed amount, preferably ±5%, a display on screen (16), or the screen of PC (65), will show that the sensor (8) is misreading the pressure.

If there was no leak found under the no leak wiggle test, the vacuum pump (53) and vacuum pump solenoid (56) are turned on to build pressure to a set point, preferably at 8 inches of water. At 8 inches of water the vacuum pump (53) and vacuum pump solenoid (56) are turned off. The fuel containment and handling system is monitored by the pressure transducer (15), and the orifice solenoid (18) is turned on. The pressure now is allowed to decay through this calibration orifice (18). The pressure is now clocked by the microprocessor (20), or the microprocessor of PC (65) from one set point to a second set point, preferably at 7 inches of water decaying to 0.1 inches of water. The time it takes to decay the pressure through the calibration orifice from 7 inches of water to 0.1 inches of water allows calculation of the vapor space contained within the containment and handling system. The time for the pressure decay is now looked up on a look-up table that will give the exact vapor space of the system. This decay rate calculation is more accurate than the pressure build time calculation; however either calculation could be used. The vapor space calculation is now compared to the decay rate calculation; both give the volume contained within the system. Both volumes should be approximately the same if the fuel level gauge (11) is reading accurately. This allows for a very accurate way to test the fuel level gauge (11) reading.

If the vehicle fuel tank level sensing unit (11) misreads, the OBDII system (2) will allow leak testing to run when it should not. One such example is when the fuel tank is full but the fuel level indicates the fuel tank is ½ filled. This can allow for a false leak DTC to be set in the OBDII system. Therefore, the EVAP machine (67) must be able to accurately calculate the vapor volume contained within the fuel tank and compare it with the actual reading form the fuel level sensor.

If there is no leakage found and the fuel level sensor is tested and is reading accurately, a Reid Vapor Pressure (RVP) test will be run. The RVP of the fuel can cause the OBDII system to set a false leak test failure. This occurs due to the fuel being heated and turning into a vapor (as the fuel turns into a vapor it expands). This expansion creates a pressure change in the fuel containment system, which raises the pressure within the fuel containment system. To the OBDII system (2) when testing for leakage, this looks like a containment leak. This can cause the OBDII system to set a leak DTC when no leak is in the system.

The vapor point for gasoline changes through the year; this is due to the RVP of the fuel being blended for the ambient air temperature for the time of year. There are about 5 different gasoline blends over the period of a year. In warmer temperatures gasoline will turn from a liquid to a vapor very easily, and this can occur at a temperature of about 90 to 100 degrees Fahrenheit at atmospheric pressure. As the pressure drops in the fuel containment system, the vapor point of the fuel drops as well. The EVAP machine (67) has a temperature sensor (19) inside the machine that is used to test the ambient air temperature. Once the fuel containment system has passed a basic leak test and the ambient condition is correct, the EVAP machine (67) will run a RVP test on the vehicle's fuel. This is accomplished by checking the fuel containment system in two pressure conditions. These pressure set points are preferably at 8 inches of water. First the EVAP machine runs a leak test with a negative pressure and the display will ask the technician to shake the vehicle, this fuel slosh allows the fuel to turn from a liquid to a vapor much more readily. The pressure within the fuel tank (10) will increase, and this pressure reading preferably will be taken at 60 seconds of time after the vehicle is shaken. The EVAP machine (67) will then vent the pressure that is within the fuel containment and handling system to the atmosphere through the absorption filter (36). The absorption filter (36) will remove hydrocarbons any time the EVAP machine vents, through vacuum pump filter (54) and pressure pump filter (55), the vapor pressure from the fuel containment and handling system. This makes a safer, less flammable discharge from the EVAP machine. Once the pressure is vented to the atmosphere, the EVAP machine (67) runs a leak test with a positive pressure, and the microprocessor (20), or the microprocessor in PC (65), using display (16), or the screen of PC (65), will ask the technician to shake the vehicle (again, this fuel slosh allows the fuel to turn from a liquid to a vapor much more readily). The pressure within the fuel tank will increase, and this pressure reading will preferably be taken at 60 seconds after the vehicle is shaken. The two tests should have very close to the same results. Slightly different results would indicate that the negative pressure had lowered the fuel's boiling point which, in turn, allowed the fuel to change states from a liquid to a vapor. When the RVP of the fuel is high, the fuel vaporization will cause a change in the negative pressure thus changing the results between the negative and positive leak tests. If the RVP of the fuel is determined to be higher than a preprogrammed set point, preferably 8% difference between tests, an alert is indicated, preferably an alert buzzer (21) and alert light (22) turned on with a message displayed indicating that fuel RVP is high which can cause false leak DTC to set. This RVP test can be accomplished with using only vacuum but is not as accurate. However, different pressures and times could be used to obtain the same results.

Additionally it will be necessary to provide a running leak test to the fuel containment and handling system. This can be accomplished in two different ways. The first method is to control the vent valve solenoid (6), purge valve solenoid (1), and bypass valve solenoid (69) if equipped (FIG. 5), with the EVAP machine smart leads (31-32-33). The microprocessor (20), or microprocessor of PC (65), using display (16), or the screen of PC (65), will ask the technician to start the vehicle. The EVAP machine (67) will have the purge valve (1) open before the vehicle's engine is started; this allows the pressure transducer (15) to monitor the pressure within the containment system. As soon as the pressure changes the EVAP machine (67) knows that the engine is running. If the pressure does not change within 20 seconds of time after the display, the purge valve (1) is closed. The display screen (16), or the screen of PC (65), shows message changing to inquire whether the engine has been started. If the technician answers yes, the purge valve (1) is opened while monitoring the pressure in the fuel containment system. If no pressure increase is read, a display screen (16), or the screen of PC (65) has a message shown indicating to check vacuum to purge valve, or purge valve bad. If there was a pressure increase the control of the purge valve solenoid is now pulsed. Each pulse of the purge valve solenoid will have a change in pressure within the containment system. The EVAP machine (67) is programmed to monitor these pulses with the pressure transducer (15). This assures the hose (64) between the EVAP machine (67) and the containment system is clear and connected to the fuel containment and handling system. This will also check the purge flow by the vacuum pressure pulled into the system each time the valve (1) is opened. The pressure is monitored with the vent valve solenoid (6) open in order to assure the vent has no restriction. The vent valve solenoid (6) is now closed and the pressure is increased to a set point, preferably at 8 inches of water. The purge valve solenoid (1) is now closed and the fuel containment and handling system pressure is monitored with the pressure transducer (15) that is within the EVAP machine (67). The pressure changes within the fuel containment and handling system are docked with microprocessor (20), or the microprocessor of PC (65). If no pressure change occurs over time, there is no leak present. The pressure rate of change will give the size of the leak within the fuel containment system. The pressure change is docked between two set points; the preferred set points and time are 7 inches of water decaying to 6 inches of water in a time period of 60 seconds.

The vacuum decay rate over time can be used to determine the leak size (FIG. 9). However, this is not accurate without the vapor space within the fuel containment and handling system. In order for an accurate leak size to be determined, a chart will be needed that gives volume to decay rate. Once the vacuum decay rate is calculated, a chart will be used that provides a vacuum decay rate to volume within the fuel containment and handling system. The calculated vapor space within the containment and handling system is used for the vapor volume of the system and the decay rate is taken from the leak test. By using the volume to decay chart (FIG. 6), the leak size can be accurately calculated.

The pressure in the containment system is also monitored for an increase in pressure. Once the purge valve (1) is closed, if the pressure still increases this would be caused by a leaking purge valve. If the pressure within the containment system increases, the display screen (16), or the screen of PC (65), will show a message indicating that the purge valve is leaking. The control ground lead is monitored so if the OBDII computer (2) starts to control the purge valve (1) the system (67) opens the vent (6). OBDII systems do not purge when they first start; the EVAP machine (67) has about 4 to 5 minutes to complete the running leak test before the OBDII system (2) will purge. The EVAP machine (67) is programmed so that if the pressure increase is greater than 10 inches of water the vent valve (6) is immediately opened. If the pressure within the fuel containment and handling system still increases, an alert lamp (22) and buzzer (21) are turned on with a message displayed on screen (16), or the screen of PC (65), indicating turn engine off immediately, system under too much vacuum, and check for restricted vent.

Since the volume of air that the engine moves is much greater than EVAP machine (67) pumps (53), it is easier to see containment system problems such as additional restrictions (such as carbon in the hoses, valves, or lines from the carbon canister (14) failing) or a missing restriction (some manufacture install a restriction in the purge hose (B) to limit the vacuum pull from a running engine). If an additional restriction is in the system, the pressure will pull down to the target pressure quickly and then the pressure will decay. The EVAP machine (67) will identify these problems and the display screen (16), or the screen of PC (65), will give the correct message indicating the system has a restriction between the purge valve (1) and fuel tank (10). If a restriction is missing from the system, the pressure will pull down to the target pressure and the purge valve (1) will close. In this condition the pressure within the containment system is pulled too quickly on the system. This will allow the pressure to hit the target but will immediately stabilize. To stabilize the fuel containment system the pressure will rapidly decrease and then become very steady with no decay present. The immediate decrease in pressure will set a large leak DTC, however, no leak is present in the fuel containment system. The EVAP machine (67) will identify these problems and the display screen (16), or the screen of PC (65) will give the correct message indicating the system has a restriction missing or the wrong purge valve is installed.

This running test can also be run with a scan tool. The EVAP machine (67) will guide the technician through the display screen (16), or the screen of PC (65) to manually run an OBDII containment leak self test with a scan tool. The second way is for the EVAP machine to run the OBDII containment leak self test directly using the VCI (41). It is important for the EVAP machine (67) to monitor system pressure so it can watch the self test run. If the smart leads are connected to the vehicle, the EVAP machine (67) is programmed to monitor the solenoids (1), (6) and, if present, (69) so the on and off state will be known. This will allow very accurate testing of the system.

The EVAP machine (67) can also provide testing on other containment and handling systems using the principles and methods described previously and herein. These systems include but are not limited to Leak Detection Pump (LDP), Natural Vacuum Leak Detection (NVLD), Evaporative System Integrity Monitor (ESIM), Diagnostic Tank Leak Module (DTLM), and Leak Detection Pump Module (LDPM).

A Leak Detection Pump (LDP) is a positive displacement pump that operates on positive pressure. The ODBII computer grounds a solenoid within the LDP. This solenoid when open allows engine vacuum to enter a diaphragm chamber pulling up the diaphragm against a calibrated spring. When the diaphragm is pulled to the top of the chamber a reed switch is applied that applies a ground on the switch circuit. The solenoid is then shut off by the computer thus shutting off the engine vacuum; the spring returns the diaphragm down forcing air volume into the fuel containment and handling system. The solenoid opens again allowing engine vacuum into the diaphragm chamber pulling the diaphragm up until the switch at the top of the stroke is applied grounding the switch circuit. This again shuts off the solenoid, closing the valve thus shutting off the engine vacuum. The calibrated spring then pushes the diaphragm down pushing air pressure into the fuel containment and handling system. This cycle is repeated until the containment system pressure is equal to the calibration spring which is calibrated at 7.5 inches of water. At 7.5 inches of water the pressure in the fuel containment system is equal to the pressure in the LDP. At this point the switch is held in a grounded position. The OBDII computer times the switch in this grounded position. If there is no leak the switch stays at ground. If a leak is present the calibration spring will force the diaphragm down, this will unground the switch and the solenoid will now open allowing the engine vacuum into the chamber thus allowing the pump diaphragm to rise, closing the switch. If the pressure is not equal to the calibration spring the diaphragm is pushed down forcing volume into the fuel containment system. The OBDII computer will monitor the frequency of the switch. This will allow the OBDII computer to size the leak within the fuel containment system. The EVAP machine (67) has circuits built into the machine that will control the LDP like the OBDII computer. The smart leads (31-32-34) are connected to the LDP (with back probes) or the LDP electric connector is unplugged and the EVAP machine (67) LDP connector (42) is plugged into the LDP. The LOP pump can now be controlled by the EVAP machine (67). The circuit to control the solenoid will test the circuit's current thus checking the solenoid. A leak test can now be run by the EVAP machine (67). The test hose (64) will be connected to the vehicle fuel containment system. The pressure transducer (15) within the EVAP machine (67) will now monitor the pressure discharges from the LDP. If no pressure is generated by the LDP a message will be displayed on screen (16), or the screen of PC (65), indicating check the vacuum hose from the engine to the LDP, if the engine vacuum is present at the LDP, the LDP may be bad. If the LDP pressure discharges are low a message will be displayed on screen (16), or the screen of PC (65), indicating check the engine vacuum at the LDP. Check the LDP air filter for restriction. If there is a leak present the EVAP machine (67) will display the leak size. If the LDP builds the pressure too quickly for the calculated fuel vapor space, a message will be displayed on screen (16), or the screen of PC (65), indicating there is a restriction or blockage between the LDP and the fuel tank.

The leak test can also be run by a scan tool. This can be accomplished in two ways. The EVAP machine (67) will guide the technician with the display screen (16), or the screen of PC (65), to manually run a scan tool in order to run a leak self test. The second method will be to run the leak self test directly with the VCI (41). The testing hose (64) will be connected to the system so the self test can be monitored.

During the self test a test voltage lead (34-35) can also be connected to the switch circuit, power circuit, and ground circuit. This will enable the EVAP machine to check the power and ground circuits for voltage drops. If there is no voltage or a voltage drop is present, a message will be displayed on screen (16), or the screen of PC (65), check power circuit to the LDP. If a ground circuit has a voltage drop the message will be displayed on screen (16), or the screen of PC (65), indicating check ground circuit to the LDP. If the switch circuit voltage is high and does not change the voltage state, a message will be displayed on screen (16), or the screen of PC (65), indicating check engine vacuum to LDP, check LDP, check switch circuit in LDP. If using smart leads (31-32-33) and the switch circuit is low or has no voltage, the message on the display screen (16), or the screen of PC (65), will indicate the LDP switch wire has no voltage unplug LDP. The EVAP machine (67) will monitor the switch circuit, and if the voltage is now present a message on the display screen (16), or the screen of PC (65), will indicate LDP switch shorted to ground replace LDP. If no power is present when the LDP is unplugged, the message on the display screen (16), or the screen of PC (65), will indicate unplug the OBDII computer. The EVAP machine (67) will monitor the switch circuit. If the smart lead now has the −3.5 bias voltage, a message is displayed on screen (16), or the screen of PC (65), indicating OBDII computer not powering the LDP switch, check power and ground at the OBDII computer, check computer connections. If when the OBDII computer is unplugged there is no bias voltage, a message will be displayed on screen (16), or the screen of PC (65), indicating LDP switch wire from LDP to OBDII computer shorted to ground. Additionally, the vent on the LDP can be plugged and the EVAP machine (67) will run pressure tests both positive and negative on the fuel containment and handling system. The smart lead (31-32-33) can be attached to the purge valve solenoid. The purge valve can now be tested for circuit operation and mechanical operation. All leak testing on the LDP system can be run by the EVAP machine (67) previously described in this patent application.

The Natural Vacuum Leak Detection (NVLD) system uses the ideal gas law. The ideal gas law dictates that a temperature change for a gas in a sealed system will have a corresponding pressure change. The NVLD accomplishes this while the engine is off. In the engine off state the vent valve (6) is commanded to open the system. This purges the air out of the system upon shutting the engine off. It then closes the vent so the system can be sealed. The purge valve (1) is naturally closed so at this point the fuel containment and handling system is sealed. The dynamistic temperature change and mass flux between the liquid fuel and the vapor space drive pressure changes within the fuel containment system. Very small or no pressure change within the fuel containment and handling system indicates leakage is present. The NVLD uses a valve that under a positive pressure of 0.5 inches of water opens the containment and handling system venting the system. The NVLD uses a valve that under a vacuum of 3 to 6 inches of water vents the fuel containment and handling system. A diaphragm is used that under a vacuum of 1 inch of water will pull up, closing a switch. The OBDII computer monitors this switch with a clock to determine if the fuel containment and handling system is leaking.

The EVAP machine testing hose (64) is connected into the fuel containment and handling system. The smart leads (31-32-33) are connected to the NVLD. The EVAP machine microprocessor (20), or the microprocessor of PC (65), using display (16), or the display of PC (65), will ask the technician to start the engine. With the engine started the NVLD solenoid will be powered, turning on the solenoid. The EVAP machine (67) is programmed to monitor the NVLD wiring. When the engine is running the solenoid should be powered, the switch should be open having voltage on the wire, and the ground wire should be at ground level. If the solenoid wire is not powered, the message on the display screen (16), or the display of PC (65), will indicate to check the NVLD power wire to the NVLD solenoid. If the switch wire has no voltage, the message on the display (16), or the screen of PC (65), will indicate the NVLD switch wire has no voltage unplug NVLD. The EVAP machine (67) will monitor the switch circuit, and if the voltage is now present a message on the display screen (16), or the screen of PC (65), will indicate NVLD switch shorted to ground replace NVLD. If no power is present when the NVLD is unplugged, the message on the display screen (16), or the screen of PC (65), will indicate to unplug the OBDII computer. The EVAP machine (67) will monitor the switch circuit. If the smart lead now has the −3.5 bias voltage, a message is displayed on screen (16), or the screen of PC (65), indicating OBDII computer not powering the NVLD switch, check power and ground at the OBDII computer, check computer connections. If when the OBDII computer is unplugged there is no bias voltage, a message will be displayed on screen (16), or the screen of PC (65), indicating NVLD switch wire from NLVD to OBDII computer shorted to ground. If the ground wire has a voltage drop, a message is displayed on screen (16), or the screen of PC (65), indicating check NVLD ground circuit for resistance.

The technician will be asked to turn the engine off. The EVAP machine (67) will monitor the NVLD for the power to the solenoid to not be present. This shows the engine has been shut off. The EVAP machine (67) then turns on the pressure pump (53) and pressure solenoid (57) and monitors the pressure within the fuel containment system with the pressure transducers (15) in the EVAP machine (67). If the pressure is limited to 0.5 inches of water, the NVLD pressure release is good. If the pressure is higher than the preprogrammed target, preferably 0.8 inches of water, a message is displayed on screen (16), or the screen of PC (65), indicating replace NVLD pressure release pressure high. The EVAP machine turns off the pressure pump (53) and pressure pump solenoid (57). The EVAP machine (67) now turns on the vacuum pump (53) and vacuum pump solenoid (56). The switch voltage state is monitored. At 1 inch of water the switch voltage should be pulled to ground, and at 3 inches of water to 6 inches of water the pressure release should open. If the switch does not close at a preprogrammed target, preferably 1.5 inches of water, a message is displayed on screen (16), or the screen of PC (65), indicating NVLD switch stuck open, replace NVLD. If the pressure does not release at a preprogrammed target, preferably 6.3 inches of water, a message is displayed on screen (16), or the screen of PC (65), indicating vacuum pressure release incorrect replace NVLD. If a leak is found or no leak is found, the vehicle vent can be plugged and all leak testing can be run by the EVAP machine (67) as previously described in this patent application on the NVLD system.

An Evaporative System Integrity Monitor (ESIM) uses two valves that are weighted. The pressure release valve weight is larger, and the vacuum release valve weight is a smaller weight. The pressure check valve will release positive pressure from the fuel containment system at a pressure of 0.5 inches of water. The vacuum check valve will release vacuum from the fuel containment system at a pressure of 2.2 inches of water. A diaphragm is pulled into a switch thus closing the switch contacts at a vacuum pressure of greater than 0.8 inch of water.

The EVAP machine testing hose (64) will be connected into the fuel containment and handling system. The smart leads (31-32-33) are connected to the ESIM two wire switch. The EVAP machine (67) is programmed to monitor the ESIM switch wiring, and the switch should be open having voltage on the wire. If the switch wire has no voltage, the message on the display screen (16), or the screen of PC (65), will indicate the ESIM switch wire has no voltage unplug ESIM. The EVAP machine (67) will monitor the switch circuit, and if the voltage is now present, a message on the display will indicate ESIM switch shorted to ground replace ESIM. If no power is present when the ESIM is unplugged, the message on the display screen (16), or the screen of PC (65), will indicate unplug the OBDII computer. The EVAP machine will monitor the switch circuit. If the smart lead now has the −3.5 bias voltage, a message is displayed on screen (16), or the screen of PC (65), indicating OBDII computer not powering the ESIM switch, check power and ground at the OBDII computer, check computer connections. If when the OBDII computer is unplugged there is no bias voltage, a message will be displayed on screen (16), or the screen of PC (65), indicating ESIM switch wire from ESIM to OBDII computer shorted to ground. If the voltage on the switch wire is good, the EVAP machine (67) turns on the pressure pump (53) and pressure solenoid (57) and monitors the pressure within the fuel containment system with the pressure transducers (15) in the EVAP machine (67). If the pressure is limited to 0.5 inches of water, the ESIM pressure release is good. If the pressure is higher than the preprogrammed target, preferably 0.8 inches of water, a message is displayed on screen (16), or the screen of PC (65), indicating replace ESIM pressure release pressure high. The EVAP machine (67) turns off the pressure pump (53) and pressure pump solenoid (57). The EVAP machine now turns on the vacuum pump (53) and vacuum pump solenoid (56). The switch voltage state is monitored. At 0.8 inch of water the switch voltage should be pulled to ground, and at 2.2 inches of water the pressure release should open. If the switch does not close at a preprogrammed target, preferably 1.2 inches of water, a message is displayed on screen (16), or the screen of PC (65), indicating ESIM switch stuck open, replace ESIM. If the pressure does not release at a preprogrammed target, preferably 2.4 inches of water, a message is displayed on screen (16), or the screen of PC (65), indicating vacuum pressure release incorrect replace ESIM. If a leak is found or no leak is found, the vent can be plugged and all leak testing can be run by the EVAP machine as previously described in this patent application on the ESIM system.

A Diagnostic Tank Leak Module (DTLM) is an electric driven pump that pumps air volume into the fuel containment and handling system. The electric pump current is monitored in the OBDII computer with a voltage drop created by a resistance that is in the pump circuit. A calibration orifice is switched into the air flow from the pump. The OBDII computer monitors the current as the pump forces a positive pressure through the calibration orifice. The OBDII computer now knows what the maximum leak size, under the present atmospheric conditions, is equal to. The orifice is now switched out of the air flow so the air can pressurize the fuel containment and handling system. The current from the pump circuit is monitored over time, and if the current is lower than the calibration current there is a leak present that will set a DTC for a leakage. If the current is higher than the calibration circuit, no leak is present.

The EVAP machine (67) is designed to run the pump and switching valve just like the OBDII computer. The wiring to the DTLM is unplugged and a lead (43) from the EVAP machine (67) is connected to the DTLM. The EVAP machine (67) now directly runs the tests on the fuel containment and handling system. If a leak is found to be present, a message is displayed on screen (16), or the screen of PC (65), with the leak size. Additionally, the scan tool can be used to run the OBDII computer self leak test. The scan tool can be used by a technician to manually run the test. The EVAP machine (67) will guide the technician with messages on the display screen (16), or the screen of PC (65). The scan tool can also directly be run by the EVAP machine VCI (41). When the scan tool is used, the voltage leads (34-35) are connected to monitor the OBDII self test, and from this data the EVAP machine (67) will test the system and display on screen (16), or the screen of PC (65), the results on the leak size. If a leak is found or no leak is found, the vent can be plugged and all leak testing can be run by the EVAP machine as previously described in this patent application on the DTLM system.

A Leak Detection Pump Module (LDPM) is an electric driven pump that pumps air volume out of the fuel containment and handling system. The electric pump is turned on and a calibration orifice is switched into the air flow from the pump. The OBDII computer monitors the negative pressure with a pressure sensor as the pressure is pulled through the calibration orifice. The OBDII computer now knows what the maximum leak size, under the present atmospheric conditions, is equal to. The orifice is now switched out of the air flow so the air can pressurize the fuel containment and handling system. The pressure from the pressure sensor is monitored over time, and if the pressure is lower than the calibration pressure there is a leak present that will set a DTC for a leak. If the pressure is higher than the calibration pressure, no leak is present.

The EVAP machine (67) is designed to run the pump, switching valve, and pressure sensor just like the OBDII computer. The wiring to the LDPM is unplugged and a lead (44) from the EVAP machine (67) is connected to the LDPM. The EVAP machine (67) now directly runs the tests on the fuel containment and handling system. If a leak is found to be present, a message is displayed on screen (16), or the display of PC (65), with the leak size. Additionally, the scan tool can be used to run the OBDII computer self leak test. The scan tool can be used by a technician to manually run the test. The EVAP machine will guide the technician with messages on the display screen (16), or the screen of PC (65). The scan tool can also directly be run by the EVAP machine using VCI (41). When the scan tool is used, the voltage leads (34-35) are connected to monitor the OBDII self test, and from this data the EVAP machine (67) will test the system and display on screen (16), or the screen of PC (65), the results on the leak size. If a leak is found or no leak is found, the vent can be plugged and all leak testing can be run by the EVAP machine as previously described in this patent application on the LDPM system.

The EVAP machine allows all of the tests (vent valve solenoid test, purge valve solenoid test, by-pass valve solenoid test, vacuum leak test, pressure leak test, wiggle leak test, wiggle no leak test, system isolation leak test, gas cap test, fuel level sensor test, fuel tank pressure sensor test, containment and handling volume testing, running leak test, calibration switch test, monitor OBDII vehicle self test, fuel RVP test, LDP test, NVLD test, ESIM test, LDPM test, DTLM test, leak find location tests) to be run individually or in combination in a manual testing mode. In the manual test mode it is up to the technician to determine which tests are run or the sequence in which the tests are run, and any test can be run isolated or in any combination.

If a leak is detected in the fuel containment and handling system, the EVAP machine (67) will need to find the point of leakage. If the leak size is a gross or large leak, smoke will likely be the preferred method. However, most leaks within the fuel containment and handling system are of a medium to very small leakage size, and under these conditions CO2 and HC sensing is preferred. Also, smoke machines are not effective in identifying leaks smaller than a hole 0.020 inches in diameter. (A comparison between the use of smoke from a smoke machine (i.e., a Snap-on Smart Smoke Machine EELD500) with the use of CO2 of the present invention demonstrates that the smoke machine has very limited ability. For each and every comparison: (1) the leak site location is known prior to the test; (2) the lighting to see smoke is optimized; (3) there is no air movement in the testing area; (4) the smoke generating machine is set at 12.5 inches of water column, which is the factory setting; and (5) the CO2 pressure is set at 14.0 inches of water column. Further, and again for every test, the sealed system being tested for a leak is first filled with smoke from the Snap-on smoke machine, sealed, and then pressurized. These are not real world conditions, but are optimized to determine the maximum capabilities (in terms of smallest hole size) for the smoke machine. Tests were conducted on holes having the following diameters: 0.001"; 0.002"; 0.005"; 0.010"; 0.015"; 0.020"; 0.025"; and 0.030". In all cases the CO2 was detected. However, in the case of smoke: (1) no smoke was detected coming from any of the 0.001", 0.002", 0.005", or 0.010" holes; (2) a very very little amount of smoke was observed exiting from the 0.015" hole; (2) a very little amount of smoke was observed exiting from the 0.020" hole; (3) a little amount of smoke was observed exiting from the 0.025" hole; and (4) smoke was observed exiting from the 0.030" hole.) The EVAP machine (67) will accomplish this by opening a solenoid valve (61) to the C02 canister (59). The pressure regulator (50) on the C02 canister (59) is adjusted to preferably 14 inches of water. This will allow the C02 to safely pressurize the test hose and the vehicle fuel containment and handling system. This C02 gas is needed so that if the leak is away from the gasoline and there are no HC's carried out of the systems leak, the C02 gas will still be present at the leak sight. This sensing to find leakage can be done with CO2 alone or, where HCs are known to be present, with HC alone. However, CO2 is preferred to monitor for system leakage. A gas analyzer as described herein is very good at detecting C02 and HC. In the case of CO2, this is due to the fact that the filtering needed for C02 gas readings from an infrared source is the smallest amount needed from any of the trace readings. Stated another way, the infrared filtering for the CO2 gas is the least amount, so it is the most sensitive. Additionally, readings from CO2 and HC sensing cells work very well also and will limit the latency of the reading(s) to the EVAP machine (67). This is due to not moving the air from the test site with a pump through a typically 20 foot long hose to the typical infrared gas bench. Thus, when using the configuration disclosed in FIGS. 28 and 38, which has no pump, the reading is taken directly at the sensing cell(s), either (29), or (30) or both, which is preferably at the end of a long (e.g., 14 inches) flexible coupling (37) that is attached at the end of a control handle (40). The sensing cells (29)-(30) are moved along the containment and handling systems lines, hoses, actuators, carbon canister, fuel fill system, fuel level sensor, and the fuel tank that is under CO2 pressure. These sensing cells will give a reading change from a leak within the fuel containment system of CO2 or HC within 1 second. Since the sensing cells are located directly over the leak site, the latency is minimized. This will allow the EVAP machine (67) to read this C02 or HC trace, thus locating the source of the containment system's leakage. These sensing cells (29)-(30) can locate a leak size down to at least 0.001 inch hole diameter in the case of CO2, and down to at least 0.005 inch hole diameter in the case of HC. In order for the leak detection system to work better, the leak size that is found during the decay test will be used to adjust the CO2 pressure. If a large leak is found the CO2 pressure will be lowered to a preprogrammed pressure level, preferably 4 inches of water. If a very small leak is found the CO2 pressure will be increased to a preprogrammed pressure level, preferably 14 inches of water. The sensing cell (29)-(30) reading(s) is also adjusted for sensitivity. The sensing cells (29)-(30) can be made to be very sensitive or less sensitive. This helps the accuracy of the leak detection system. The EVAP machine's microprocessor (20), or the microprocessor of PC (65) is programmed to monitor these leak traces for C02 or HC. When the microprocessor detects that the CO2 or HC level readings have changed above a preprogrammed set point, preferably 0.1 volt change, the microprocessor will alert the user, preferably by setting off an alert buzzer (21), alert lamp (22), and a message will be displayed on screen (16), or the screen of PC (65), on the leak size. The leak size is calculated by the amount of CO2 or HC read.

Once the area has been found by the sensing cells (29) (30), which will be isolated to a very small area, the exact location of the leak must be found. Very small leaks can not been seen with the eye, so the EVAP machine (67) can pump (28) a leak find solution from bottle (27) on the area found by the cells (29)(30). The leak find solution is a blend of soaps that allows the pressure leaking from the containment system to create bubbles at the leak site. The EVAP machine control handle (40) has a pump switch (39) and discharge port (38) that allows the technician to spray leak find solution from bottle (27) on the leak location. This control handle (40) also has the flex coupling (37) that holds the gas sensing cells (29) (30), so once the leak area is found by the cells (29) (30) on the vehicle it is quite easy to apply leak solution from bottle (27) to the leakage area. This leak detection method can be used to locate many other leaks on the vehicle as well. One such example would be an intake manifold on the engine that had a leak.

This leak detection control handle (40) can be made where it is not part of the EVAP machine (67), but is an isolated unit. This unit can find gas traces produced from a leak with an electronic circuit and a gas sensing cell. This leak detector can alert the technician of a leak with an alert lamp or an alert buzzer or other alert mechanism. In another configuration, this isolated control handle can also provide a leak pump and leak find solution that can be applied to the leak area, allowing the technician to see the exact location of the leak.

Due to the cost of the EVAP machine (67), there may be any of a number of embodiments of the invention. The embodiments or configurations can contain any of the parts, either in a singular format or multiple formats. These different parts of the EVAP machine (67) can be assembled in multiple configurations. The most basic configuration of the EVAP machine (67) would include a smoke or vapor chamber (45) with smart leads (31-32-33). When smoking a fuel containment and handling system, the vent must be closed, and the smart leads make this a simple task for the technician. In another basic configuration of the EVAP machine (67), it would include a smoke chamber (45), smart leads (31-32-33), and CO2 leak detection (59-50-45-61-29-30). With this system, if the vapor or smoke could not been seen the leak could still be located. In another configuration of the EVAP machine (67), it would include a pressure transducer (15). This would allow a leak to be sized correctly. This function would allow the technician a pass/fail test. If the system passed, there is no leak; if the system failed, then the technician would need to find the leak. This leak detection could be done with just a smoke camber (45) or CO2 leak detection (59-50-45-61-29-30). In some machines both smoke (45) and CO2 leak detection (59-50-45-681-29-30) could be installed. In another configuration, the EVAP machine (67) would include a pressure transducer (15) and CO2 leak detection (59-50-45-61-29-30). Smoke or vapor would not be needed at all; CO2 is a superior way to find fuel containment and handling system leakage. In another configuration, the EVAP machine (67) would include a pressure transducer (15), smart leads (31-32-33), and CO2 leak detection (59-50-45-61-29-30). In another configuration the EVAP machine (67) could include a pressure transducer (15), smoke chamber (45), CO2 leak detection (59-50-45-61-29-30), pressure and vacuum pumps (53), and smart leads (31-32-33). This system would allow more powerful testing of the fuel containment and handling system. In another configuration the EVAP machine (67) would include a pressure transducer (15), smoke chamber (45), CO2 detection (59-50-45-61-29-30), pressure and vacuum pumps (53), smart leads (31-32-33), and a VCI (41). In this configuration, yet more powerful diagnostics can be run. In another configuration the EVAP machine (67) would include a pressure transducer (15), smoke chamber (45), CO2 detection (59-50-45-61-29-30), pressure and vacuum pumps (53), smart leads (31-32-33), VCI (41), and a PC computer (65). With the microprocessor (PC) comes a far more powerful system. Now not only can the EVAP machine have better displays and more power processing, but the system can be controlled over the internet. This allows for an expert to diagnosis the fuel containment and handling system from a remote location. Additionally software updates could be done online. The ability to connect to the internet can also be accomplished with the microprocessor. As can be seen by just a few examples of the EVAP machine, many different configurations are possible in the field.

The information conveyed from the EVAP machine to the technician can be done with lights, LEDs, digital display, alert buzzer, or display screens, or other known methods of visual displays.

Whereas the drawings and accompanying description have shown and described the preferred embodiments of the present invention, it should be apparent to those skilled in the art that various changes may be made in the form of the invention without affecting the scope thereof.

We claim:

1. A method of detecting and locating a leak site in a vehicle's on-board fuel containment and handling system (herein "containment system"), which containment system can be pressurized with CO2 gas to a pressure which allows the CO2 gas contained within the containment system to escape from the leak site; the method utilizing a source of CO2 gas which is external to the containment system; the method further including the use of means for connecting the source of CO2 gas to the containment system; the method also utilizing an electronic detector, including a housing and a sensor capable of detecting CO2 gas, which can scan at least some of the external surfaces of the containment system for the leak site, the detector including an alert system; the method comprising the steps of:
    connecting the external source of CO2 gas to the fuel handling and containment system with the connecting means;
    sealing the fuel handling and containment system;
    pressurizing the containment system with the CO2 gas;
    scanning with the detector for the presence of CO2 gas escaping from the leak site; and
    activating the alert system when the sensor detects the presence of CO2 gas escaping from the leak site.

2. The method as set forth in claim 1, wherein the alert system includes both an audio and a visual alert, and the method includes activating at least one of the audio and visual alerts.

3. The method as set forth in claim 1, wherein the housing includes a flexible connector having first and second ends, wherein the first end is connected to the housing and wherein the sensor is connected to the second end, and wherein the method includes the step of moving the second end and the sensor over at least some of the external surfaces.

4. The method as set forth in claim 1, wherein further including a pressure regulator connected between the external source of the CO2 gas and the means for connecting the CO2 gas to the containment system, and wherein the method includes regulating the pressure of the CO2 in the containment system.

5. The method as set forth in claim 1, wherein further including smoke generating apparatus connected to the means for connecting the CO2 gas to the containment system, and wherein the method further includes injecting smoke into the containment system.

6. The method as set forth in claim 1, wherein further including a leak finding composition of matter, and wherein the method further includes applying the composition of matter to the external surfaces of the containment system in the area where the detector has detected CO2 gas escaping from the leak site.

7. The method as set forth in claim 6, further including means for applying the composition of matter including an applicator and means for forcing the composition of matter through the applicator.

8. A method of detecting and locating a leak site in a vehicle system which can be pressurized with CO2 gas to a pressure which allows the CO2 gas contained within the vehicle system to escape from the leak site; the method utilizing a source of CO2 gas which is external to the vehicle system; the method further including the use of means for connecting the source of CO2 gas to the vehicle system; the method also utilizing an electronic detector, including a housing and a sensor capable of detecting CO2 gas, which can scan at least some of the external surfaces of the vehicle system for the leak site, the detector including an alert system; the method comprising the steps of:
    connecting the external source of CO2 gas to the vehicle system with the connecting means;
    pressurizing the vehicle system with the CO2 gas;
    scanning with the detector for the presence of CO2 gas escaping from the leak site; and
    activating the alert system when the sensor detects the presence of CO2 gas escaping from the leak site.

9. The method as set forth in claim 8, further including the step of sealing the vehicle system before pressurizing the system with CO2 gas.

10. A method of locating a point of leakage in a sealed system on a vehicle, the sealed system is pressurized with $CO_2$ gas to a pressure higher than the surrounding pressure of the sealed system; the method utilizing a source of $CO_2$ gas which is external to the containment system; the method also utilizing an electronic detector capable of detecting $CO_2$ gas which can scan at least some of the external surfaces of the sealed system, the detector including an alert system which can be activated when $CO_2$ gas is present in the area adjacent the point of leakage; the method further including the use of a leak find solution which can be applied to the external surfaces in the area adjacent the point of leakage to find the point of leakage; the method comprising the steps of:

connecting the external source of $CO_2$ gas to the sealed system;

pressurizing the sealed system with $CO_2$ gas to a pressure in excess of the pressure surrounding the sealed system;

scanning with the detector to detect the presence of $CO_2$ gas escaping from the point of leakage;

activating the alert system when the detector detects the presence of $CO_2$ gas; and applying the leak find solution to the external surfaces adjacent to the point of leakage to find the point of leakage.

11. A method of detecting the location of a leak from a leak site in a fuel containment system, the containment system including one or more external surfaces, the method including the use of a pressurized first composition of matter selected from the group including a gas from a source external to the containment system and vaporized fuel from the containment system (hereinafter "hydrocarbons"), at least one of which is capable of passing through the leak site, and a second composition of matter which is capable of adhering to at least a portion of the one or more external surfaces and which is capable of showing the presence of first pressurized composition of matter escaping from the leak site, the method including the steps of:

pressurizing the interior of the containment system to a pressure in excess of the pressure surrounding the containment system to force at least some of the first pressurized composition of matter through the leak site; and covering at least a portion of the external surface with the second composition of matter to identify the location of the leak site by the interaction of the at least some of the first pressurized composition of matter escaping from the leak site with the second composition of matter.

12. The method as set forth in claim 11, wherein the second composition of matter includes at least one soap capable of forming a least one bubble in the presence of at the leaking first pressurized composition of matter, and the step of covering includes covering the area of the leak site.

13. The method as set forth in claim 11, wherein the second composition of matter is a solution, and the step of covering includes covering the area of the leak site so that the interaction of the solution and the leaking first pressurized composition of matter will form the at least one bubble.

* * * * *

UNITED STATES PATENT AND TRADEMARK OFFICE
CERTIFICATE OF CORRECTION

PATENT NO.         : 9,846,104 B1
APPLICATION NO.    : 15/178997
DATED              : December 19, 2017
INVENTOR(S)        : Bernie C. Thompson et al.

Page 1 of 1

It is certified that error appears in the above-identified patent and that said Letters Patent is hereby corrected as shown below:

In the Claims

Column 26, Line 21, Claim 12 delete "at".

Signed and Sealed this
Twenty-fifth Day of September, 2018

Andrei Iancu
*Director of the United States Patent and Trademark Office*